United States Patent
Rai

(10) Patent No.: US 10,196,021 B2
(45) Date of Patent: *Feb. 5, 2019

(54) USER PROFILE SYNCHRONIZATION FOR A VEHICLE

(71) Applicant: TOYOTA INFOTECHNOLOGY CENTER USA, INC., Mountain View, CA (US)

(72) Inventor: Vinuth Rai, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/361,274

(22) Filed: Nov. 25, 2016

(65) Prior Publication Data

US 2017/0072883 A1  Mar. 16, 2017

Related U.S. Application Data

(63) Continuation of application No. 14/570,541, filed on Dec. 15, 2014, now Pat. No. 9,533,640.

(51) Int. Cl.
*B60R 16/037* (2006.01)
*B60W 50/00* (2006.01)
(Continued)

(52) U.S. Cl.
CPC .......... *B60R 16/037* (2013.01); *B60W 10/08* (2013.01); *B60W 10/30* (2013.01); *B60W 40/08* (2013.01); *B60W 40/09* (2013.01); *B60W 50/0098* (2013.01); *B60W 50/085* (2013.01); *G06Q 30/0645* (2013.01); *H04L 67/1095* (2013.01); *H04L 67/12* (2013.01); *H04L 67/306* (2013.01);
(Continued)

(58) Field of Classification Search
CPC ............ B60R 16/037; G06Q 30/0645; B60W 50/098; B60W 40/09; B60W 2720/00; B60W 10/08; B60W 10/30; B60W 40/08; B60W 50/085; B60W 2540/28; B60W 2710/30; B60W 2050/0064; B60W 2550/40; H04L 67/1095; H04L 67/306; H04L 67/12
See application file for complete search history.

(56) References Cited

U.S. PATENT DOCUMENTS 5,940,072 A * 8/1999 Jahanghir ............... H04N 21/40
  348/E5.002
8,538,408 B2 * 9/2013 Howarter ............ B60R 25/2009
  455/420

(Continued)

*Primary Examiner* — Richard M Camby
(74) *Attorney, Agent, or Firm* — Burbage Law, P.C.; Jon-Michael Burbage; Elizabeth Ruzich

(57) ABSTRACT

The disclosure includes a system and method for reconfiguring a vehicle based on one or more preferences of a first user without the first user directly providing an input to the vehicle to reconfigure the vehicle. The method may include wirelessly receiving first user profile data at a vehicle. The first user profile data may be associated with a first user. The first user profile data may describe how one or more settings of the vehicle should be configured for the first user. Upon receipt of the first user profile data, the vehicle may be configured in accordance with second user profile data describing how the one or more settings of the vehicle should be configured for a second user. The method may include reconfiguring the one or more settings of the vehicle based on the first user profile data so that the vehicle is reconfigured for the first user.

20 Claims, 19 Drawing Sheets

(51) Int. Cl.
*B60W 40/09* (2012.01)
*G06Q 30/06* (2012.01)
*H04L 29/08* (2006.01)
*B60W 10/08* (2006.01)
*B60W 10/30* (2006.01)
*B60W 40/08* (2012.01)
*B60W 50/08* (2012.01)

(52) U.S. Cl.
CPC . *B60W 2050/0064* (2013.01); *B60W 2540/28* (2013.01); *B60W 2550/40* (2013.01); *B60W 2710/08* (2013.01); *B60W 2710/30* (2013.01); *B60W 2720/00* (2013.01)

(56) References Cited

U.S. PATENT DOCUMENTS

2013/0099892 A1* 4/2013 Tucker ............... G07C 9/00309
340/5.61
2015/0298689 A1* 10/2015 Schwartz ............. B60W 10/24
701/22

\* cited by examiner

1100

1500

CONSIDER HEADING BACK SOON!

Teddy's reservation starts in 30 minutes.

SEE YOU SOON AVA!

Don't forget to take all your belongings with you!

Figure 17

USER PROFILE SYNCHRONIZATION FOR A VEHICLE

CROSS-REFERENCE TO RELATED APPLICATIONS

This patent application is a continuation of U.S. patent application Ser. No. 14/570,541, entitled "User Profile Synchronization for a Vehicle" filed on Dec. 15, 2014, the entirety of which is hereby incorporated by reference.

BACKGROUND

The specification relates to providing user profile synchronization for a vehicle. For example, the specification relates to providing user profile synchronization for two or more users of a single vehicle.

Not all users can afford to drive a vehicle. Current alternatives to vehicle ownership include taxis, public transportation and vehicle leasing. Taxis and public transportation may be undesirable because they are inconvenient or perceived as dangerous or unhygienic. Vehicle leasing may be more desirable than taxis or public transportation. However, many users cannot afford to lease a vehicle.

SUMMARY

According to one innovative aspect of the subject matter described in this disclosure, the disclosure may include a system and method for reconfiguring a vehicle based on one or more preferences of a first user without the first user directly providing an input to the vehicle to reconfigure the vehicle. The method may include wirelessly receiving first user profile data at a vehicle. The first user profile data may be associated with a first user. The first user profile data may describe how one or more settings of the vehicle should be configured for the first user. Upon receipt of the first user profile data, the vehicle may be configured in accordance with second user profile data describing how the one or more settings of the vehicle should be configured for a second user. The method may include reconfiguring the one or more settings of the vehicle based on the first user profile data so that the vehicle is reconfigured for the first user.

In general, another innovative aspect of the subject matter described in this disclosure may be embodied in methods that include: providing a CoLease agreement in which a first user and a second user may lease a vehicle and one or more user specified rules and one or more financial terms of the CoLease agreement provide the first user and the second user with the option to book one or more reservations for the vehicle in accordance with the one or more user specified rules and the one or more financial terms of the CoLease agreement, wherein the one or more user specified rules describe rules associated with use of the vehicle and the one or more financial terms describe the amount of time each of the first user and the second user may use the vehicle during a time period; receiving an input provided to a touchscreen indicating a request of the first user to book a reservation for the vehicle at a specified time chosen by the first user; and initiating wireless transfer of first user profile data associated with the first user to the vehicle via a network so that the vehicle may be reconfigured based on one or more first preferences of the first user as indicated by the first user profile data, wherein prior to the initiating the vehicle was configured based on one or more second preferences of the second user as indicated by second user profile data associated with the second user.

Other aspects include corresponding methods, systems, apparatus, and computer program products for these and other innovative aspects.

The disclosure is particularly advantageous in a number of respects. For example, the disclosure may describe a system and method to enable two or more people to lease the same vehicle under predetermined terms and user specified rules as participants in a CoLease Agreement. The participants in the CoLease agreement may create their own rules for any issue relating to the CoLease agreement. For example, the rules may apply to where the vehicle is to be parked, how to allocate vehicle expenses like fuel and maintenance among the participants, and any other issues relating to the vehicle associated with the CoLease agreement. The system may provide the participants with intuitive Graphical User Interfaces (GUI or GUIs) on their smartphone, tablet computer or laptop. The GUIs may be configured for use with a touchscreen to receive inputs from the participants. The participants may use these GUIs to invite friends or relations to participate in the CoLease agreement. The participants may also use the GUIs to select the vehicle for the CoLease agreement, create the rules for the CoLease agreement and sign the CoLease agreement, etc. The system may also include GUIs, systems and methods to enable the participants to book reservations for using the vehicle, locate the vehicle in a crowded parking lot, bring the vehicle back to a designated location when it is another participant's reserved time for using the vehicle, and manage expenses for the vehicle in accordance with the terms and user specified rules.

BRIEF DESCRIPTION OF THE DRAWINGS

The disclosure is illustrated by way of example, and not by way of limitation in the figures of the accompanying drawings in which like reference numerals are used to refer to similar elements.

FIG. 15 is a graphic representation of an example booking reminder graphical user interface.

FIG. 17 is a graphic representation of an example salutation graphical user interface.

DETAILED DESCRIPTION

Figure 1:
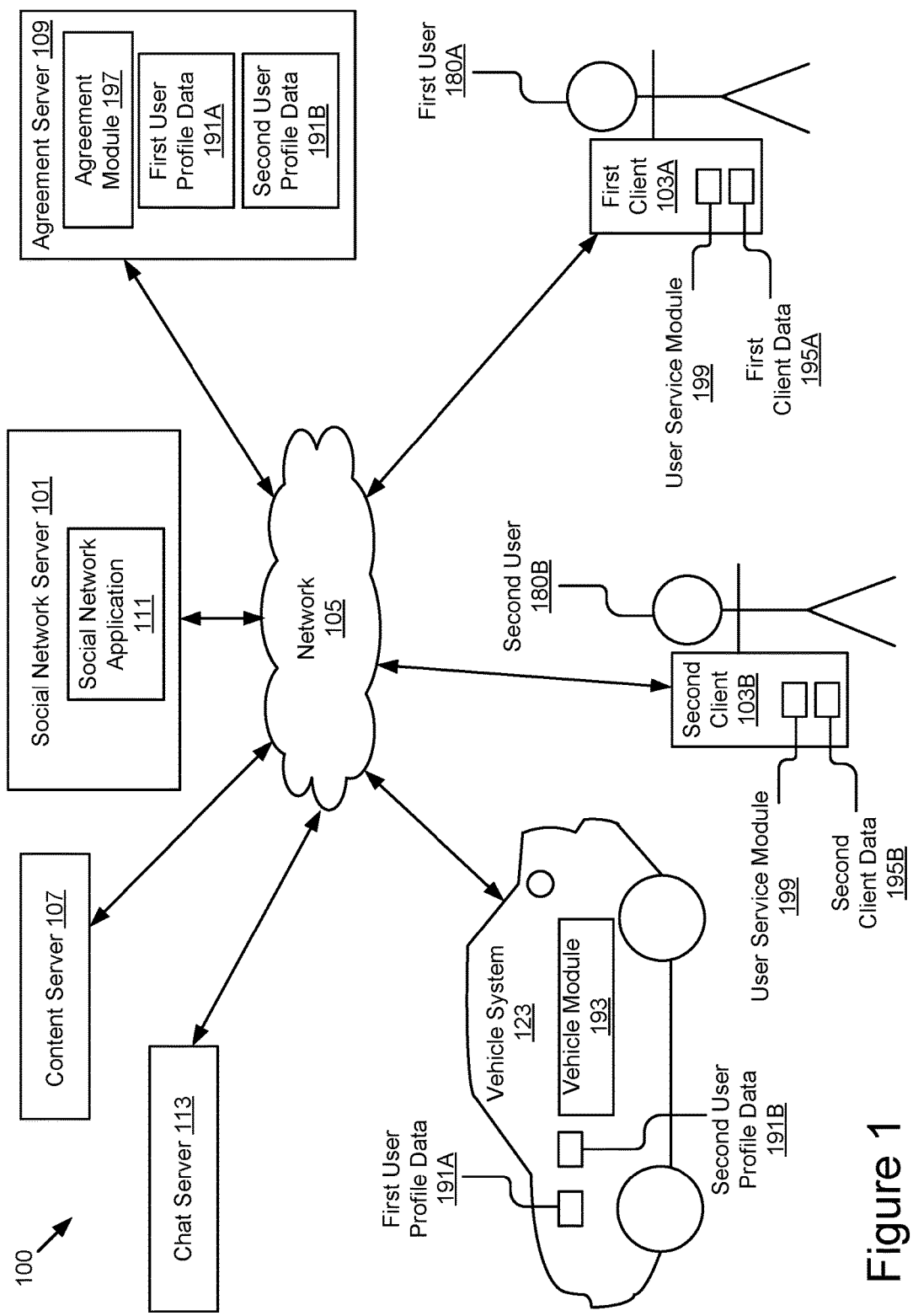
FIG. 1 is a block diagram illustrating an example system for providing user profile synchronization.

A problem with current vehicle leases is that the customer is required to lease a whole vehicle for private use. However, the customer may only need a vehicle for a few days out of the week. These customers may prefer to share a lease for a vehicle with some of their friends. Some customers may not be able to afford lease payments or vehicle expenses for a private vehicle and would prefer to share the vehicle, lease contract and payments and vehicle expenses with some of their friends. Currently, customers have no way to share a vehicle lease, lease payments and vehicle expenses with their friends.

This disclosure includes a systems, methods and graphical user interfaces (GUIs) that provide a "CoLease service." The CoLease service may include a vehicle lease in which multiple people lease the same vehicle under predetermined contract terms and user-specified rules. A group of people may participate in the CoLease service by electronically signing a CoLease agreement using a touchpad of an electronic device. The people may participate in the CoLease agreement as individuals who are not participating in a vehicle service through their employer. In some implementations, the individuals that participate in the CoLease agreement are not corporations.

The people who sign the CoLease agreement may be referred to as "participants." The participants in the CoLease agreement may agree to share a vehicle during a lease term and abide by rules defined by the participants when using the vehicle. The participants in the CoLease agreement may create their own rules for any issue relating to the CoLease agreement. For example, the rules may apply to where the vehicle is to be parked (e.g., do not park in a parking lot that is not lit at night), how to allocate vehicle expenses like fuel and maintenance among the participants, and any other issues relating to the vehicle.

The participants may use intuitive, easy to understand GUIs on touchscreen-enabled processor-based computing devices (e.g., a smartphone, tablet computer, laptop, etc.) to invite friends to participate in the CoLease agreement. Participating in the CoLease agreement may include two stages. The first stage may include creating the CoLease agreement. The second stage may include how the participants cooperate together during the term of the CoLease agreement.

For example, assume that a first person has recently graduated from college and has a new job that only requires them to work for three days a week. Because this person only goes to work three days a week, they may be a good candidate to participate in a CoLease agreement. A second person may live near the first person and not be able to afford to lease a private vehicle because they are living on a fixed income. The first person and the second person may be good candidates to participate in the CoLease agreement together. In this way, both people may have access to a vehicle during the times they need the vehicle while still living within their budgets.

The participants in the CoLease agreement may access GUIs on their smartphones to reserve time when they can use the vehicle. The smartphone application may include functionality to assist them in finding the location of the vehicle which may otherwise be hard to locate since they may not have been the last person to park the vehicle.

As the participants use the vehicle, they may each establish their own user profile data. The user profile data may include information such as the participant's ergonomic settings for the vehicle, device pairings, radio presets, music streaming preferences, navigation settings and calendar data. The user profile data implemented by the vehicle may be updated each time a different participant uses the vehicle. Each participant's user profile data may be wirelessly synced from a cloud server and downloaded to the vehicle for each reservation so that the current participant using the vehicle can use the vehicle while enjoying their preferred ergonomic settings, device pairings, radio presets, music streaming preferences, navigation settings and calendar data.

Example System Overview

FIG. 1 illustrates a block diagram of one implementation of a system 100 for providing a vehicle service and user profile synchronization. The system 100 may include a first client 103A and a second client 103B, a vehicle system 123, a content server 107, a social network server 101, an agreement server 109, a chat server 113 and a network 105. The first client 103A and the vehicle system 123 may be accessed by a first user 180A. The second client 103B and the vehicle system 123 may be accessed by a second user 180B. The first user 180A and the second user 180B may be participants in a CoLease agreement. The vehicle system 123 may be the vehicle shared by the first user 180A and the second user 180B in accordance with the CoLease agreement. The first user 180A and the second user 180B may be referred to herein collectively or individually as "the users 180" or "the user 180." The first client 103A and the second client 103B may be referred to herein collectively or individually as "the client 103" or "the clients 103."

In the illustrated implementation, the client 103, vehicle system 123, content server 107, social network server 101, agreement server 109 and chat server 113 may be communicatively coupled via the network 105. Communication among these elements of the system 100 may be bidirectional. The communication among these elements of the system 100 and the network 105 may be via a wired or wireless connection.

The system 100 may include other servers or devices not shown in FIG. 1 including, for example, a navigation server for providing navigation data, a weather server for providing weather data and a financial server for processing financial payments.

The clients 103 and the vehicle system 123 included in FIG. 1 may be used by way of example. While FIG. 1 illustrates two clients 103 and one vehicle system 123, the disclosure applies to a system 100 having one or more clients 103 or one or more vehicle systems 123 of varying or same types. Although FIG. 1 illustrates one content server 107, one social network server 101, one agreement server 109 and one chat server 113, the disclosure applies to a system 100 having one or more content servers 107, one or more social network servers 101, one or more agreement servers 109 and one or more chat servers 113. Although FIG. 1 illustrates one network 105 communicatively coupled to the clients 103, vehicle system 123, content server 107, social network server 101, agreement server 109 and the chat server 113, in practice one or more networks 105 may be connected.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 105 may include a Global Positioning Service (GPS) satellite for providing GPS navigation to the client 103 or the vehicle systems 123. The network 105 may be a mobile data network such as 3G, 4G, LTE, Voice-over-LTE ("VoLTE"), or any other mobile data network or combination of mobile data networks. In some implementations, the network 105 may include Bluetooth® Low Energy (Bluetooth LE) communication networks or any other Bluetooth® communication network. In some implementations, the network 105 may include dedicated short-range communication (DSRC) networks.

The vehicle system 123 may be a mobile communication node. For example, the vehicle system 123 may be a vehicle (e.g., an automobile, a bus, an airplane, a boat), a general-purpose robot, a special-purpose robot such as an autonomous vehicle or a semi-autonomous vehicle, a drone or any other mobile system. The vehicle system 123 may be an electric vehicle, hybrid vehicle or a vehicle that includes an internal combustion engine.

In some implementations, the vehicle system 123 may include a computing device that includes a memory and a processor. For example, the vehicle system 123 is a vehicle including an onboard computer. In some implementations, the vehicle system 123 may include a mobile client device. For example, the vehicle system 123 may include a tablet, a smartphone, an infotainment system, or another type of computing device.

A user 180 may interact with the vehicle system 123. For example, the user 180 may be a human that travels in the vehicle system 123.

The vehicle system 123 may include hardware or software to enable the vehicle system 123 to wirelessly access the network 105. For example, the vehicle system 123 may include an infotainment system to provide one or more network services to a user 180 of the vehicle system 123. The vehicle system 123 may receive network services data via the network 105. The infotainment system of the vehicle system 123 may use the network services data to provide one or more network services to the user. The network services data may be stored on the content server 107. The network services data may be any data needed to provide the network service to the vehicle system 123. The network services data may include audio data, video data, e-mail data, calendar data or any other data necessary to stream the network services described below. For example, the network services data may include audio data for enabling the user 180 of the vehicle system 123 to stream music via the infotainment system of the vehicle system 123.

In some implementations, the vehicle system 123 may include one or more sensors (not shown), such as a navigation sensor (e.g., a GPS sensor), an infrared detector, a motion detector, a thermostat, a sound detector, and any other type of sensors. For example, the vehicle system 123 may include sensors for measuring one or more of a current time, a current location (e.g., a latitude, longitude, and altitude of a location), an acceleration of the vehicle system 123, a velocity of the vehicle system 123, a fuel tank level of the vehicle system 123, a battery level of the vehicle system 123, or an activity of an occupant of the vehicle system 123, etc. The sensors of the vehicle system 123 may include an interior cabin camera, a weight sensor, a carbon monoxide sensor, or any other sensor to detect the activity of the occupant of the vehicle system 123. The sensors of the vehicle system 123 may include a buffer or some other non-transitory memory to store the network services requested by the user of the vehicle system 123.

The vehicle system 123 may include one or more of a first user profile data 191A and a second user profile data 191B. The first user profile data 191A may include any data associated with the first user 180A and the second user profile data 191B may include any data associated with the second user 180B. The first user profile data 191A may be kept separate from the second user profile data 191B and vice versa. The first user profile data 191A may be inaccessible by the second user 180B and the second user profile data 191B may be inaccessible to the first user 180A.

In some implementations, the first user profile data 191A and the second user profile data 191B may be stored locally on a memory of the vehicle system 123 at the same time. Alternatively, the first user profile data 191A may only be stored on the vehicle system 123 when the first user 180A is using the vehicle system 123 and the second user profile data 191B may only be stored on the vehicle system 123 when the second user 180B is using the vehicle system 123. For example, the first user 180A may book a reservation to use the vehicle system 123 and the agreement server 109 may sync the first user profile data 191A to the vehicle system 123 in time for use by the first user 180A in accordance with the reservation to use the vehicle system 123.

The first user profile data 191A and the second user profile data 191B may be referred to herein collectively or individually as "the user profile data 191." In describing the user profile data 191, the first user 180A and the second user 180B may be referred to collectively or individually as "the user 180" or "the users 180." However, it is to be understood that each user 180 has their own user profile data 191 that describes their own preferences for configuring the vehicle system 123.

The user profile data 191 may describe settings preferred by the user 180 when traveling in the vehicle system 123. For example, the user profile data 191 may describe one or more ergonomic settings for the vehicle system 123 for use by the vehicle system 123 when the user 180 is traveling in the vehicle system 123, one or more device pairings for use by the vehicle system 123 when the user 180 is traveling in the vehicle system 123, user account information for one or more network services associated with the user 180 for use by the vehicle system 123 when the user 180 is traveling in the vehicle system 123, one or more settings for a navigation system of the vehicle system 123 for use by the vehicle system 123 when the user 180 is traveling in the vehicle system 123 and one or more electronic calendars for use by the vehicle system 123 when the user 180 is traveling in the vehicle system 123.

In some implementations, the one or more ergonomic settings described by the user profile data 191 may include ergonomic data describing one or more of the following: how a steering wheel of the vehicle system 123 should be adjusted when the user 180 is traveling in the vehicle system 123; how a seat of the vehicle system 123 should be adjusted when the user 180 is traveling in the vehicle system 123; and how one or more mirrors of the vehicle system 123 should be adjusted when the user 180 is traveling in the vehicle system 123. In some implementations, elements of the vehicle system 123 may be powered by motors that reconfigure these elements based on the ergonomic settings. For example, a driver's seat of the vehicle system 123 may be repositioned by electric motors so that the driver's seat is configured based on the ergonomic settings. The steering wheel and mirrors of the vehicle system 123 may be similarly adjusted. In some implementations, the vehicle module 193 may include code and routines to cause a controller and one or more motors of the vehicle system 123 to reconfigure elements of the vehicle system 123 based on user profile data 191.

In some implementations, the settings for the one or more device pairings described by the user profile data 191 may include device pairings data describing one or more devices that are authorized to pair with the vehicle system 123 by the user 180 and any data or information necessary for the vehicle system 123 to pair with these devices via a wireless communication network such as Bluetooth. The devices which pair with the vehicle system 123 using the device pairings data may include one or more clients 103 associated with the user 180. In some implementations, the vehicle module 193 may include code and routines to reconfigure a communication unit of the vehicle system 123 to automatically pair with the one or more clients 103 associated with the user 180 based on the user profile data 191.

In some implementations, the user account information for one or more network services associated with the user 180 may include any data or information necessary for the vehicle system 123 to stream one or more network services associated with the user 180. For example, the vehicle system 123 includes an infotainment system that includes functionality to wirelessly stream one or more network services via the network 105. The vehicle system 123 may include other hardware (e.g., one or more displays, one or more speakers, etc.) or software necessary to enable the user 180 to consume the one or more network services streamed via the network 105. In some implementations, the vehicle module 193 may include code and routines to reconfigure one or more of a communication unit and an infotainment system of the vehicle system 123 to automatically connect with the one or more network services associated with the user 180 based on the user profile data 191. In this way the vehicle system 123 may be automatically reconfigured so that the vehicle system 123 can stream content from the one or more network services associated with the user 180 without input from the user 180 to reconfigure the vehicle system 123.

The network services may include one or more of the following: navigation instructions; streaming audio or video (such as Pandora™, Spotify™, iTunes™, Google Play™, YouTube™, Netflix™, Hulu Plus™, Crackle™, Amazon™ Instant Video, Prime Instant Video, Digital Music Store, Prime Music App Store, etc.); social networking (such as Facebook™, Google+™, LinkedIn™, Tinder™, QQ™, etc.); microblogging (such as Twitter™, Tumblr™, etc.); online chatting (such as Google Chat™, Snapchat™, WhatsApp™, etc.); online content sharing (such as Instagram™, Pinterest™, etc.); e-mail (such as Gmail™, Outlook™ Yahoo! Mail™, etc.); file sharing (such as Dropbox™, Google Drive™, MS OneDrive™, Evernote™, etc.); electronic calendar and scheduling (such as Google™ Calendar, MS Outlook™, etc.); and etc. In some implementations, the client data 195 may include data necessary to enable the user 180 to consume one or more of these networks services via the infotainment system of the vehicle system 123.

In some implementations, the user profile data 191 may include one or more of the following: one or more radio station presets for an infotainment system of the vehicle system 123 describing how the infotainment system settings should be adjusted when the user 180 is traveling in the vehicle system 123; one or more audio equalizer settings for the infotainment system of the vehicle system 123 describing how the infotainment system settings should be adjusted when the user 180 is traveling in the vehicle system 123; one or more thermostat settings or other settings for the climate control system of the vehicle system 123 describing how the climate control system of the vehicle system 123 should be adjusted when the user 180 is traveling in the vehicle system 123; and one or more garage door settings enabling the vehicle system 123 to control operation of one or more garage doors associated with the user 180. In some implementations, the vehicle module 193 may include code and routines to reconfigure elements of the vehicle system 123 based on the user profile data 191. For example, the infotainment system of the vehicle system 123 may be reconfigured to include the radio station presets for the user 180 based on the user profile data 191.

In some implementations, the one or more settings for the navigation system of the vehicle system 123 included in the user profile data 191 may include the user's home address and any data necessary to enable the vehicle system 123 to navigate to the user's home address when the user 180 is traveling in the vehicle system 123.

In some implementations, the one or more electronic calendars for use by the vehicle system 123 when the user 180 is traveling in the vehicle system 123 may be included in the network services of the user 180. Optionally, the one or more electronic calendars may be a local calendar associated with the client 103.

The vehicle system 123 may include a vehicle module 193. The vehicle module 193 may include code and routines configured to reconfigure the vehicle system 123 based on the user profile data 191. For example, the second user 180B may have booked time with the vehicle system 123 on May 11 at 2:00 PM (Pacific Standard Time, "PST"). The first user 180A may use the vehicle system 123 on May 11 until 1:30 PM (PST). The vehicle module 193 may monitor the time of day, determine that the second user 180B has a next booked time to use the vehicle system 193 and initiate a download of the second user profile data 191B associated with the second user 180 to the vehicle system 123. The vehicle module 193 may download the second user profile data 191B from the agreement server 109. The vehicle module 193 may reconfigure the vehicle system 123 based on the second user profile data 191B.

In some implementations, the vehicle module 193 may include code and routines configured to provide one or more of the graphical user interfaces ("GUI" or "GUIs") 1100, 1200, 1300, 1500, 1600, 1700 described below with reference to FIGS. 11-13 and 15-17. In some implementations the vehicle module 193 may also include code and routines configured to provide one or more GUIs 700, 800, 900, 1400 described below with reference to FIGS. 7, 8, 9A, 9B and 14. These GUIs may be displayed on a display of the vehicle system 123. The display of the vehicle system 123 may include a touchscreen. For example, the infotainment system of the vehicle system 123 includes a touchscreen for displaying these GUIs.

The vehicle module 193 may also include code and routines configured to receive inputs via one or more of the GUIs 700, 800, 900, 1100, 1200, 1300, 1400, 1500, 1600, 1700 and take actions responsive to these inputs. For example, the user 180 may provide an input as described below with reference methods 500, 600, 1000 of FIGS. 5, 6, 10A and 10B and the vehicle module 193 may receive this input and take action responsive to this input as described below with reference to methods 500, 600, 1000. In some implementations, the vehicle module 193 may include code and routines configured to provide some or all of the functionality described below with reference to one or more of the GUIs 700, 800, 900, 1100, 1200, 1300, 1400, 1500, 1600, 1700.

In some implementations, the vehicle module 193 may include code and routines configured to perform one or more steps of the methods 500, 600, 1000 of FIGS. 5, 6, 10A and 10B when executed by a processor such as processor 425 described below with reference to FIG. 4.

An example implementation of the vehicle module 193 will be described in more detail below with reference to FIG. 4.

The client 103 may be a processor-based computing device that includes a processor and a memory. For example, the client 103 may be a personal computer, a laptop computer, a tablet computer, a wearable device, a smartphone, a mobile telephone, a personal digital assistant ("PDA"), a mobile e-mail device, a portable game player, a portable music player, set-top box, a network-connected television, a network-connected home device or any other tangible electronic device capable of accessing the network 105. In some implementations, the wearable device may include, for example, a smartwatch or fitness tracker that communicates via the network 105.

The client 103 may include a user service module 199 and client data 195. The user service module 199 may include code and routines configured to provide client data 195 to one or more vehicle systems 123. For example, the user service module 199 may provide the client data 195 to the vehicle system 123 via Wi-Fi, Bluetooth or some other wireless communication network between the vehicle system 123 and the client 103. In some implementations, the client 103 may be hardwired to a communication unit of the vehicle system 123 and may provide the client data 195 to the vehicle system 123 via this communicative coupling. An example implementation of the communication unit of the vehicle system 123 is described in more detail below with reference to FIG. 4.

In some implementations, the user service module 199 may include code and routines configured to generate one or more of the GUIs 700, 800, 900, 1400 described below with reference to FIGS. 7, 8, 9A, 9B and 14. In some implementations, the user service module 199 may include code and routines configured to generate one or more of the GUIs 1100, 1200, 1300, 1500, 1600, 1700 described below with reference to FIGS. 11-13 and 15-17. These GUIs may be displayed on a touchscreen of the client 103.

The user service module 199 may also include code and routines configured to receive inputs via one or more of the GUIs 700, 800, 900, 1100, 1200, 1300, 1400, 1500, 1600, 1700 and take actions responsive to these inputs. For example, the user 180 may provide an input as described below with reference methods 500, 600, 1000 of FIGS. 5, 6, 10A and 10B and the user service module 199 may receive this input and take action responsive to this input as described below with reference to methods 500, 600, 1000. In some implementations, the vehicle module 193 may include code and routines configured to provide some or all of the functionality described below with reference to one or more of the GUIs 700, 800, 900, 1100, 1200, 1300, 1400, 1500, 1600, 1700.

In some implementations, the user service module 199 may include code and routines configured to perform one or more steps of the methods 500, 600, 1000 described below with reference to FIGS. 5, 6, 10A and 10B when executed by a processor such as processor 225 described below with reference to FIG. 2.

An example implementation of the user service module 199 is described below in more detail with reference to FIG. 2.

The client data 195 may include any data stored on the client 103. For example, the client data 195 may include e-mail data describing e-mails associated with the user 180, electronic calendar data associated with the user 180, an electronic address book include data describing one or more contacts associated with the user 180 and one or more email addresses, physical mailing addresses, telephone numbers and notes associated with these contacts.

In some implementations, the client data 195 may include user account information for one or more network services associated with the user 180 as described above with reference to the user profile data 191. For example, the client data 195 may include any data or information necessary for the user 180 to access or consume network services via the client 103 or the vehicle system 123.

In some implementations, the client data 195 may be included in the user profile data 191 of the vehicle system 123. For example, the client 103 may establish a Bluetooth connection with the vehicle system 123 and the user service module 199 may provide the client data 195 to the vehicle system 123 via the Bluetooth connection. The vehicle system 123 may store some or all of the client data 195 in the user profile data 191. In this way the user 180 may continue to access the client data 195 and user network services associated with the client data 195 while traveling in the vehicle system 123. For example, the user 180 may travel in the vehicle system 123 and continue to use network services associated with the client data 195 via one or more of a head unit, a heads-up display unit or infotainment system of the vehicle system 123.

In some implementations, the client data 195 may include X2V data. X2V data may include any type of object-to-vehicle data. X2V data may include information about the object's position. For example, the client data 195 may include one or more bits of data describing the geographic location of the client 103. In this way, the vehicle system 123 may be able to determine the location of the client 103 relative to the vehicle system 123.

In some implementations, the client 103 or the vehicle system 123 may include functionality to determine their relative locations using GPS or wireless signal triangulation (e.g., Wi-Fi triangulation). In some implementations, the X2V data may include one or more bits that are an indication of the source of the data.

In some implementations, one or more of the client 103 and the vehicle system 123 may include hardware or software necessary to communicate via DSRC. DSRC may include one-way or two-way short-range to medium-range wireless communication channels that are designed for automotive use. In some implementations, the DSRC implemented by the vehicle system 123 or the client 103 may use the 5.9 GHz band for transmission.

The social network server 101 may be a hardware server that includes a processor, a memory and network communication capabilities. The social network server 101 may be communicatively coupled to the network 105. The social network server 101 may send and receive data to and from other elements of the system 100 via the network 105.

The social network server 101 may include a social network application 111. The social network application 111 may include code and routines for providing a social network. The social network may be a type of social structure where one or more users 180 may be connected by a common feature. The common feature may include relationships/connections, e.g., friendship, family, work, an interest, etc. The common features may be provided by one or more social networking systems including explicitly defined relationships and relationships implied by social connections with other online users 180, where the relationships form a social graph. In some examples, the social graph may reflect a mapping of these users 180 and how they may be related.

In some implementations, the social network application 111 may generate a social network that may be used for generating suggestion. For example, the user 180 may be experiencing a life event or have an upcoming life event that may indicate that the user 180 may have an interest in participating in the CoLease service. For example, a first user 180A may have provided data to a social network indicating that they have a part time job and need a vehicle to travel to work. A second user 180B may have a relationship with the first user 180A as indicated by the social graph, and the second user 180B may provide data indicating that they desire the use of a vehicle but have limited financial resources. In this example, the social network application 111 may work with the vehicle module 193 or the user service module 199 to present an opportunity to form a group of participants in the CoLease service provided by the agreement module 197. In this way, the social network application 111 may work with one or more of the vehicle module 193 and the user service module 199 to provide personalized recommendations to the users 180 that are configured to assist the users 180 in identifying other users 180 who may want to participate in the CoLease service.

The content server 107 may be a hardware server that includes a processor, a memory and network communication capabilities. The content server 107 may be communicatively coupled to the network 105. The content server 107 may send and receive data to and from other elements of the system 100 via the network 105. For example, the content server 107 may be configured to provide one or more networks services to the vehicle system 123 or the client 103.

The agreement server 109 may be a hardware server that includes a processor, a memory and network communication capabilities. The agreement server 109 may be communicatively coupled to the network 105. The agreement server 109 may send and receive data to and from other elements of the system 100 via the network 105. For example, the agreement server 109 may be configured to transmit or manage transmission of the user profile data 191 to the vehicle system 123 responsive to determining that the user 180 has booked a reservation for the vehicle system 123 and it is time to synchronize the user profile data 191 associated with the user 180 with the vehicle system 123 so that the vehicle system 123 is reconfigured for use by the user 180.

The agreement server 109 may include an agreement module 197. The agreement module 197 may include code and routines configured to provide the CoLease service. For example, the agreement module 197 may determine an effective CoLease agreement among one or more users 180, manage reservations for the participants in a CoLease agreement, synchronize user profile data 191 to the vehicle system 123 based on the reservations and the current time, and track and allocate expenses among the participants in the CoLease agreement based on the rules and terms of the CoLease agreement and the actions of participants in relation to the vehicle system 123 including their respective usage of the vehicle system 123. In some implementations, the effective agreement may be an agreement to participate in a CoLease agreement associated with the vehicle system 123.

In some implementations, the agreement module 197 may include code and routines configured to provide graphical data for generating one or more of the GUIs 700, 800, 900, 1100, 1200, 1300, 1400, 1500, 1600, 1700 to one or more of the vehicle system 123 or the client 103. The agreement module 197 may also include code and routines configured to receive inputs to the one or more GUIs 700, 800, 900, 1100, 1200, 1300, 1400, 1500, 1600, 1700 and take actions responsive to these inputs. In some implementations, the agreement module 197 may include code and routines configured to provide some or all of the functionality described below with reference to one or more of the GUIs 700, 800, 900, 1100, 1200, 1300, 1400, 1500, 1600, 1700.

In some implementations, the agreement module 197 may include code and routines configured to perform one or more steps of methods 500, 600, 1000 when executed by a processor such as processor 325 described below with reference to FIG. 3.

In some implementations, the agreement server 109 may store one or more of the agreement module 197, the first user profile data 191A and the second user profile data 191B in the memory of the agreement server 109.

An example implementation of the agreement module 197 is described below with reference to FIG. 3.

In some implementations, one or more of the vehicle module 193, the user service module 199 and the agreement module 197 may be implemented using hardware including a field-programmable gate array ("FPGA") or an application-specific integrated circuit ("ASIC"). In some other implementations, one or more of the vehicle module 193, the user service module 199 and the agreement module 197 may be implemented using a combination of hardware and software. In some implementations, one or more of the vehicle module 193, the user service module 199 and the agreement module 197 may be stored in a combination of the devices and servers, or in one of the devices or servers.

The chat server 113 may include a hardware server that includes a processor, a memory and network communication capabilities. The chat server 113 may be communicatively coupled to the network 105. The chat server 113 may send and receive data to and from other elements of the system 100 via the network 105. In some implementations, the chat server 113 may be configured to provide one or more network services to the vehicle system 123 or the client 103. For example, the chat server 113 provides one or more of the online chatting services described above with reference to the network services. In some implementations, the chat server 113 provides a private online chatting service that is only accessible by the participants of a CoLease agreement or users 180 considering entering into a CoLease agreement. For example, a participant may tell another participant where the vehicle is parked or let the other participant know they are running behind schedule and may be late for the other participant's reservation. In implementations where the private online chat service is used by prospective participants of a CoLease agreement, the users 180 may chat together, for example, to discuss issues related to the prospective CoLease agreement.

Figure 2:
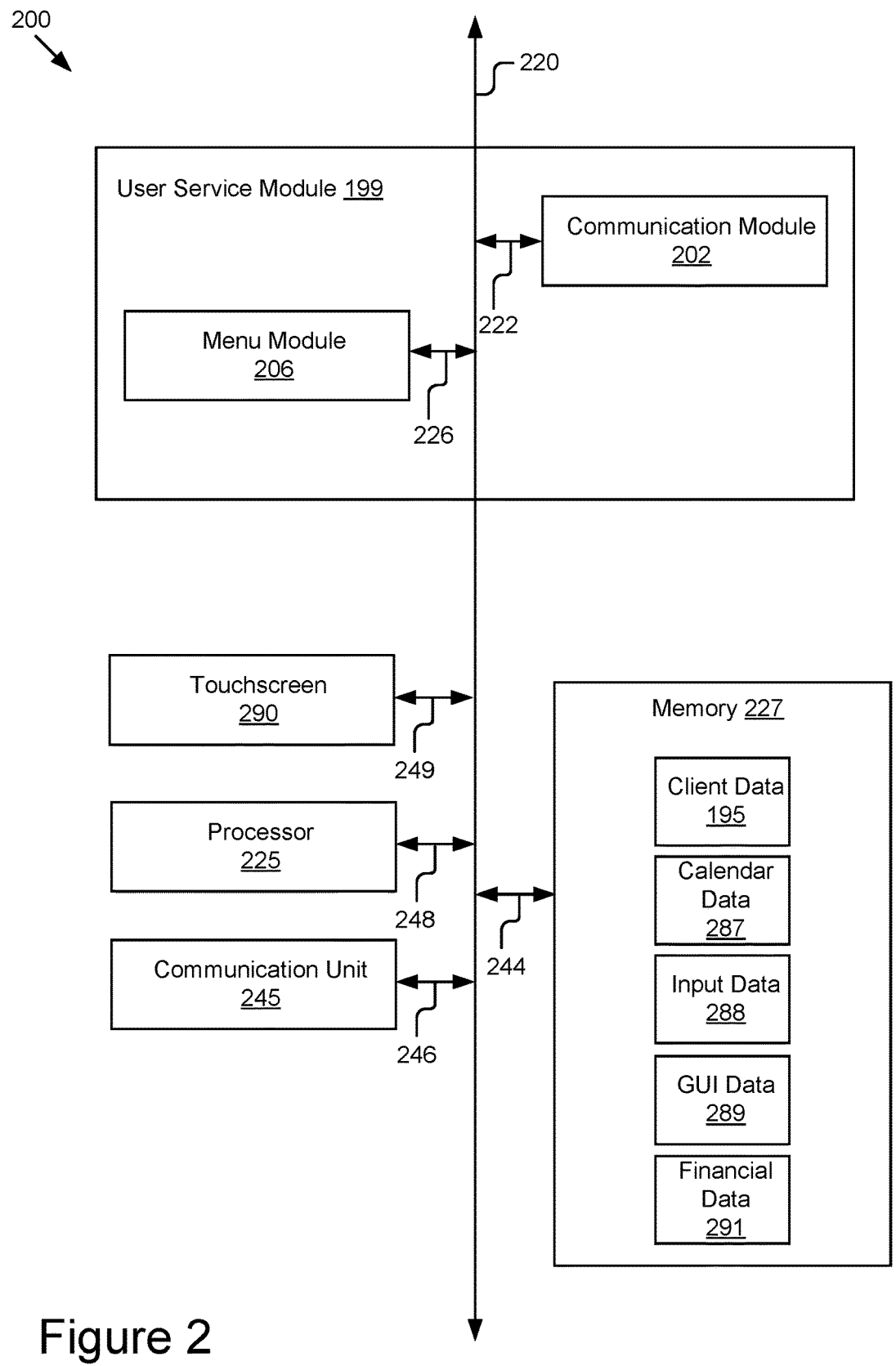
FIG. 2 is a block diagram illustrating an example user service system.

Referring now to FIG. 2, an example implementation of a user service system 200 is depicted. The user service system 200 may include the user service module 199, a touch screen 290, a processor 225, a communication unit 245 and a memory 227. These elements of the user service system 200 may be communicatively coupled by a bus 220. The touchscreen 290 may be communicatively coupled to the bus 220 via signal line 249. The processor 225 may be communicatively coupled to the bus 220 via signal line 248. The communication unit 245 may be communicatively coupled to the bus 220 via signal line 246. The memory 227 may be communicatively coupled to the bus 220 via signal line 244.

In some implementations, the user service system 200 may be a processor-based computing device. For example, the user service system 200 may be the client 103 described above with reference to FIG. 1.

In some implementations, the user service system 200 may include a special-purpose computing device configured to generate one or more of the GUIs 700, 800, 900, 1400 described below with reference to FIGS. 7, 8, 9A, 9B and 14. In some implementations, the user service system 200 may include a special-purpose computing device configured to generate one or more of the GUIs 1100, 1200, 1300, 1500, 1600, 1700 described below with reference to FIGS. 11-13 and 15-17. These GUIs 700, 800, 900, 1100, 1200, 1300, 1400, 1500, 1600, 1700 may be displayed on the touchscreen 290. The GUI data 289 may include graphical data for displaying the GUIs 700, 800, 900, 1100, 1200, 1300, 1400, 1500, 1600, 1700 on the touchscreen 290. In some implementations, some or all of the GUI data 289 is received via the network 105. For example, the agreement module 197 of the agreement server 109 may transmit the GUI data 289 via the network 105. The user service system 200 may receive the GUI data 381 and the user service system 200 may store the GUI data 381 as GUI data 289 on the memory 227. The user service module 199 may retrieve the GUI data 289 from the memory 227 and cause the touchscreen to display one or more of the GUIs 700, 800, 900, 1100, 1200, 1300, 1400, 1500, 1600, 1700 based on the GUI data 289.

In some implementations, the user service system 200 may include a special-purpose computing device configured to receive inputs via one or more of the GUIs 700, 800, 900, 1100, 1200, 1300, 1400, 1500, 1600, 1700 and take actions responsive to these inputs. For example, the user 180 may provide an input as described below with reference methods 500, 600, 1000 of FIGS. 5, 6, 10A and 10B and the user service module 199 may receive this input and take action responsive to this input as described below with reference to methods 500, 600, 1000. In some implementations, the user service system 200 may include a special-purpose computing device configured to provide some or all of the functionality described below with reference to one or more of the GUIs 700, 800, 900, 1100, 1200, 1300, 1400, 1500, 1600, 1700.

The touchscreen 290 may include an electronic visual display that the user 180 may control through touch or gestures. The touchscreen 290 may include a display for displaying one or more of the GUIs 700, 800, 900, 1100, 1200, 1300, 1400, 1500, 1600, 1700. The display of the touchscreen 290 may be configured to receive one or more inputs to the GUIs 700, 800, 900, 1100, 1200, 1300, 1400, 1500, 1600, 1700. The touchscreen 290 may include hardware, software or a combination of hardware and software for receiving, detecting and interpreting inputs received from the user 180. In some implementations, the inputs received, detected and interpreted by the touchscreen 290 may include touch or gestures provided by a bare hand or finger of the user 180. In some implementations, the display of the touchscreen 290 may be configured to receive one or more of the inputs described below with reference to the methods 500, 600, 1000 described below with reference to FIGS. 5, 6, 10A and 10B.

In some implementations, the user 180 may control or provide inputs to the touchscreen 290 by touching the display of the touchscreen 290 with a stylus or pen configured to provide an input to the touchscreen 290. In some implementations, the user 180 may control or provide inputs to the touchscreen 290 by touching the screen with one or more fingers. The fingers of the user 180 may be bare or gloved in a material configured to provide an input to the touchscreen 290. In some implementations, the touchscreen 290 may include any hardware or software needed to be controlled or determine inputs based on one or more touches provided by the user 180 to the display of the touchscreen 290.

In some implementations, the touchscreen 290 may be an element of a smartphone, tablet computer, wearable device such as a smart watch, or touch sensitive monitor or display peripheral. In some implementations, the touchscreen 290 may be an element of a head unit, heads-up display unit or infotainment system included in the vehicle system 123.

The processor 225 may include an arithmetic logic unit, a microprocessor, a general-purpose controller, or some other processor array to perform computations and provide electronic display signals to a display device. The processor 225 may process data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

In some implementations, the user service system 200 may include a special-purpose computing device configured to perform one or more steps of the methods 500, 600, 1000 described below with reference to FIGS. 5, 6, 10A and 10B when executed by the processor 225.

The memory 227 may store instructions or data that may be executed by the processor 225. The instructions or data may include code for performing the techniques described herein. The memory 227 may be a dynamic random access memory (DRAM) device, a static random access memory (SRAM) device, flash memory, or some other memory device. In some implementations, the memory 227 may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores client data 195, calendar data 287, input data 288, GUI data 289 and financial data 291. One or more of the calendar data 287, input data 288, GUI data 289 and financial data 291 may be included in the client data 195. As described above, the client data 195 may be included in the user profile data 191.

The client data 195 was described above with reference to FIG. 1, and this description will not be repeated here.

The calendar data 287 may describe one or more electronic calendars for the user 180. For example, the calendar data 287 may describe one or more electronic calendars that are locally stored on the user service system 200. The calendar data 287 may be synchronized with the vehicle system 123. The calendar data 287 may be an element of the user profile data 191. In this way the user 180 may access and interact with the electronic calendars of the calendar data 287 when traveling in the vehicle system 123. An example of the user 180 accessing an electronic calendar is described below with reference to FIG. 15.

The input data 288 may describe one or more inputs provided to one or more of the GUIs 700, 800, 900, 1100, 1200, 1300, 1400, 1500, 1600, 1700. For example, the input data 288 may describe an input provided to the touchscreen 290 for one or more of the GUIs 700, 800, 900, 1100, 1200, 1300, 1400, 1500, 1600, 1700.

The GUI data 289 may include data for generating one or more GUIs. The GUI data 289 may be configured to generate GUIs that receive input via the touchscreen 290. In some implementations, the GUI data 289 may be configured to generate one or more of the GUIs 700, 800, 900, 1100, 1200, 1300, 1400, 1500, 1600, 1700 described below with reference to FIGS. 7-9 and 11-17. In some implementations, the user service system 200 may be a special-purpose computing device configured to retrieve the GUI data 289 and render one or more of the GUIs 700, 800, 900, 1100, 1200, 1300, 1400, 1500, 1600, 1700.

In some implementations, the GUI data 289 may be configured to generate GUIs that are optimized for display on a smartphone or a tablet computer. In some implementations, the GUIs generated using the GUI data 289 may be optimized to receive touch inputs (e.g., via the touchscreen 290).

In some implementations, the GUI data 289 may be configured to generate webpages. For example, the GUI data 289 may be configured to generate one or more encrypted webpages. In some implementations, the GUI data 289 may be configured to generate one or more webpages that are optimized for electronic financial agreements based on inputs provided to a GUI via the touchscreen 290.

The financial data 291 may describe one or more financial transactions. In some implementations, the financial transactions are electronic financial transactions implemented using a menu module 206 of the user service module 199. For example, the user 180 purchases gasoline using a near field communication (NFC) module of the communication unit 245. The financial data 291 may describe account information for the financial account drawn on for the financial transaction. In some implementations, the financial account may be an account shared by one or more participants of the CoLease agreement. For example, the financial account is a fuel card shared among the participants. The financial data 291 may describe the purchases made by one or more of the participants using the financial account. An example financial transaction described by the financial data 291 is described below with reference to FIG. 14.

The communication unit 245 may transmit and receive data to and from the user service system 200. In some implementations, the communication unit 245 may include a port for direct physical connection to the network 105 or to another communication channel. For example, the communication unit 245 may include a USB, SD, CAT-5, or similar port for wired communication with one or more elements of the system 100. In some implementations, the communication unit 245 may include wireless transceiver for exchanging data or other communication channels using one or more wireless communication methods, including IEEE 802.11, IEEE 802.16, Bluetooth®, NFC or another suitable wireless communication method.

In some implementations, the communication unit 245 may include a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 may include a wired port and a wireless transceiver. The communication unit 245 may also provide other conventional connections to the network 105 for distribution of files or media objects using standard network protocols including TCP/IP, HTTP, HTTPS, and SMTP, etc.

In some implementations, the communication unit 245 may include a NFC module for providing electronic payments via NFC. The NFC module of the communication unit 245 may include code and routines for providing the electronic payments via NFC.

In some implementations, the user service module 199 may include a communication module 202 and a menu module 206. The communication module 202 may be communicatively coupled to the bus 220 via signal line 222. The menu module 206 may be communicatively coupled to the bus 220 via signal line 226.

The communication module 202 may include code and routines configured to handle communications between the user service module 199 and the other components of the user service system 200. The communication module 202 may be communicatively coupled to the bus 220 via signal line 222. In some implementations, the communication module 202 may be stored in the memory 227 and accessible and executable by the processor 225.

The communication module 202 may send and receive data, via the communication unit 245, to and from one or more of the entities of the system 100. For example, the communication module 202 transmits, via the communication unit 245, the client data 195 to the vehicle system 123 via the network 105.

In some implementations, the communication module 202 may receive touchscreen inputs to a GUI via the communication unit 245. For example, a user 180 may provide an input to the touchscreen 290. The communication unit 245 may receive this input via the touchscreen 290 and transmit input data 288 describing the input to the communication module 202. The communication module 202 may store the input data 288 on the memory 227. In some embodiments, the user service module 199 may take actions responsive to the input data 288 received by the communication module 202. In some implementations, the communication module 202 may cause the communication unit 245 to transmit the input data 288 to the agreement server 109 for use by the agreement module 197.

In some implementations, the communication module 202 receives data from one or more components of the user service system 200 and stores the data in the memory 227. For example, the communication module 202 receives input data 288 from the touchscreen 290 and stores it in the memory 227.

Figure 7:
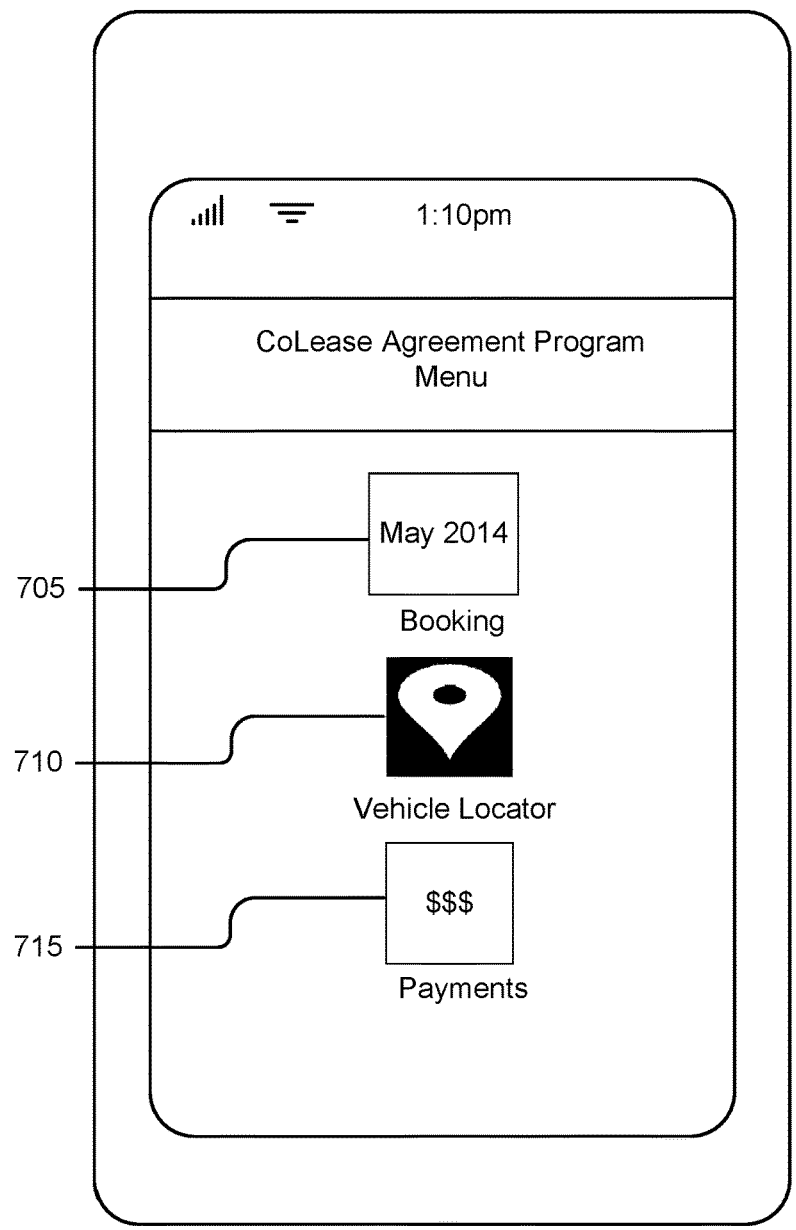
FIG. 7 is a graphic representation of an example CoLease menu graphical user interface.

The menu module 206 may include code and routines configured to provide the functionality of a CoLease menu GUI. An example of the CoLease menu GUI is depicted in FIG. 7.

The functionality of the menu module 206 may include providing booking functionality for a client device such as client 103. An example of the booking functionality that may be provided by the menu module 206 is described below with reference to FIG. 8 and the booking GUI 800. The menu module 206 may receive one or more inputs to the client 103 to reserve a time slot for the vehicle system 123. The inputs may describe the time slot in which the user 180 would like to reserve the vehicle system 123. The vehicle system 123 may be reserved for the exclusive use of the user 180 associated with the reservation. The menu module 206 may store these inputs as input data 288. The input data 288 may be transmitted to the agreement module 197 or the vehicle module 193 via the network 105. For example, the input data 288 describing the reservation for the user 180 may be transmitted to the agreement module 197 and the agreement module 197 may determine if the requested time lot is available. If the requested time slot is available, the agreement module 197 may store reservation data 387 indicating that the vehicle system 123 is reserved for the user 180 at the requested time slot. The agreement module 197 may transmit GUI data 381 for displaying an updated version of the booking GUI 800 on the client 103 that includes an indication that the vehicle system 123 is reserved for the user 180 at the time slot requested by the user 180.

The functionality of the menu module 206 may include providing vehicle locator functionality for a client device such as client 103. An example of the location functionality that may be provided by the menu module 206 is described below with reference to FIGS. 9A and 9B and the vehicle locator GUI 900. The menu module 206 may receive one or more inputs to the client 103 indicating a request to locate the vehicle system 123. For example, the user 180 may carry the client 103. The client 103 may be a smartphone. The Bluetooth® antenna of the client 103 may be activated. The Bluetooth® antenna of the client 103 may be configured to be discoverable by another Bluetooth® enabled device. The user 180 may be attempting to locate the vehicle system 123 associated with the CoLease agreement. The vehicle system 123 may be reserved for the user 180. The menu module 206 may control functionality of the communication unit 245 to locate the vehicle system 123. For example, the menu module 206 may use GPS or wireless signal triangulation functionality of the communication unit 245 to locate the vehicle system 123. The menu module 206 may retrieve GUI data 289 to cause the touchscreen 290 of the vehicle system 123 to display the location of the vehicle system on an electronic map.

In some implementations, the Bluetooth® antenna of the vehicle system 123 may be activated. Since the client 103 is configured to be discoverable, the client 103 and the vehicle system 123 may pair via Bluetooth® responsive to the client 103 coming within range of the Bluetooth® antenna of the vehicle. Responsive to detecting the pairing of the client 103 and the vehicle system 123, the vehicle module 193 of the vehicle system 123 may cause the headlights or brake lights of the vehicle system 123 to blink so that the user 180 may identify the location of the vehicle system 123. The blinking of the vehicle lights of the vehicle system 123 may be beneficial, for example, if the vehicle system 123 is among many other vehicle systems 123 in a parking lot and hard to identify among the other vehicle systems 123. In some implementations, GPS may be imprecise and the blinking of the vehicle lights may assist the user 180 to identify the vehicle system 123. The vehicle module 193 may be configured to sound a horn of the vehicle contemporaneous to blinking the vehicle lights.

In some implementations, the form of Bluetooth® used by the vehicle system 123 and the menu module 206 may be Bluetooth® LE. In some implementations, the vehicle system 123 and the menu module 206 may use Wi-Fi or some other form of wireless communication instead of Bluetooth® or in combination with Bluetooth®. For example, Wi-Fi triangulation may be used instead of Bluetooth®.

The functionality of the menu module 206 may include providing electronic payment functionality for a client device such as client 103. An example of the location functionality that may be provided by the menu module 206 is described below with reference to FIG. 14 and the vehicle function payment GUI 1400. For example, the user 180 purchases gasoline using an NFC module of the communication unit 245. The financial data 291 may describe account information for the financial account drawn on for the financial transaction. The financial data 291 may describe one or more financial accounts. In some implementations, the financial account may be an account shared by one or more participants of the CoLease agreement. For example, the financial account is a fuel card shared among the participants. The financial data 291 may describe the purchases made by one or more of the participants using the financial account. The menu module 206 may wirelessly transmit financial data 291 to a financial server that operates or controls operation of the financial account. The menu module 206 may track the amount of money spent by one or more participants.

Figure 3:
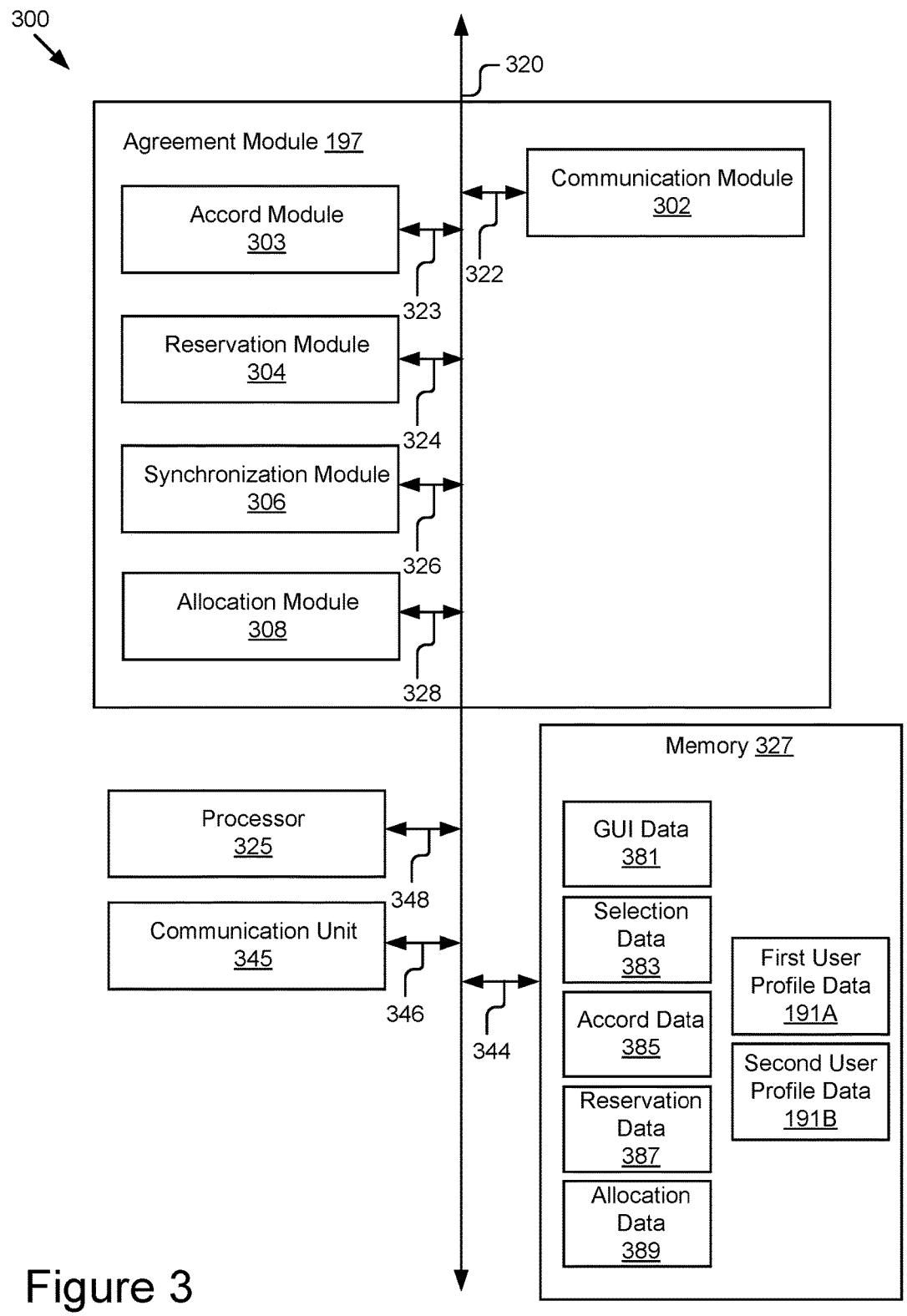
FIG. 3 is a block diagram illustrating an example agreement system.

Referring now to FIG. 3, an example implementation of an agreement system 300 is depicted. The agreement system 300 may include the agreement module 197, a processor 325, a communication unit 345 and a memory 327. These elements of the agreement system 300 may be communicatively coupled by a bus 320. The processor 325 may be communicatively coupled to the bus 320 via signal line 348. The communication unit 345 may be communicatively coupled to the bus 320 via signal line 346. The memory 327 may be communicatively coupled to the bus 320 via signal line 344.

In some implementations, the agreement system 300 may be a processor-based computing device. For example, the agreement system 300 may be the agreement server 109 described above with reference to FIG. 1.

In some implementations, the agreement system 300 may include a special-purpose computing device configured to generate one or more of the GUIs 700, 800, 900, 1400 described below with reference to FIGS. 7, 8, 9A, 9B and 14. In some implementations, the agreement system 300 may include a special-purpose computing device configured to generate one or more of the GUIs 1100, 1200, 1300, 1500, 1600, 1700 described below with reference to FIGS. 11-13 and 15-17. These GUIs 700, 800, 900, 1100, 1200, 1300, 1400, 1500, 1600, 1700 may be displayed on a touchscreen of one or more of the client 103 and the vehicle system 123. The GUI data 381 may include graphical data for displaying the GUIs 700, 800, 900, 1100, 1200, 1300, 1400, 1500, 1600, 1700 on the touchscreen of one or more of the client 103 and the vehicle system 123. For example, the agreement module 197 may transmit all or some of the GUI data 381 to the client 103 and the client 103 may use the GUI data 381 to display the reservations of the booking GUI 800.

In some implementations, some or all of the GUI data 381 is transmitted via the network 105. For example, the agreement system 300 may transmit the GUI data 381 via the network 105. The user service system 200 may receive the GUI data 381 and store it as GUI data 289 on the memory 227. The user service module 199 of the user service system 200 may retrieve the GUI data 289 from the memory 227 and cause the touchscreen to display one or more of the GUIs 700, 800, 900, 1100, 1200, 1300, 1400, 1500, 1600, 1700 based on the GUI data 289.

In some implementations, the agreement system 300 may transmit the GUI data 381 via the network 105, the vehicle service system 400 may receive the GUI data 381 via the network 105 and store it on a memory 427 as GUI data 481 and the vehicle module 193 of the vehicle system 400 may retrieve the GUI data 481 from the memory 427 and cause a touchscreen of an infotainment system of the vehicle service system 400 (or some other display of the vehicle service system 400) to display one or more of the GUIs 700, 800, 900, 1100, 1200, 1300, 1400, 1500, 1600, 1700 based on the GUI data 481.

In some implementations, the agreement system 300 may include a special-purpose computing device configured to receive inputs via one or more of the GUIs 700, 800, 900, 1100, 1200, 1300, 1400, 1500, 1600, 1700 and take actions responsive to these inputs. For example, the user 180 may provide an input as described below with reference methods 500, 600, 1000 of FIGS. 5, 6, 10A and 10B and the user service module 199 may receive this input and take action responsive to this input as described below with reference to methods 500, 600, 1000. In some implementations, the agreement system 300 may include a special-purpose computing device configured to provide some or all of the functionality described below with reference to one or more of the GUIs 700, 800, 900, 1100, 1200, 1300, 1400, 1500, 1600, 1700.

The processor 325, the communication unit 345 and the memory 327 include similar functionality as the processor 225, the communication unit 245 and the memory 227 described above with reference to FIG. 2, and so, these descriptions will not be repeated here.

In some implementations, the agreement system 300 includes a special-purpose computing device configured to perform one or more steps of the methods 500, 600, 1000 described below with reference to FIGS. 5, 6, 10A and 10B when executed by the processor 325.

As illustrated in FIG. 3, the memory 327 stores GUI data 381, selection data 383, accord data 385, allocation data 389, first user profile data 191A and second user profile data 191B. The user profile data 191A and 191B were described above with reference to FIG. 1, and so, these descriptions will not be repeated here. The GUI data 381 may include similar data as the GUI data 289 described above with reference to FIG. 2, and so, that description will not be repeated here. In some implementations, the memory 327 stores some or all of the data described below with reference to the method 600 of FIG. 6.

The selection data 383 may describe one or more selections of the user 180. For example, the selection data 383 may describe one or more selections of the user 180 when interaction occurs with one or more of the GUIs 700, 800, 900, 1100, 1200, 1300, 1400, 1500, 1600, 1700 described below with reference to FIGS. 7-9 and 11-17. In some implementations, the selection data 383 may describe one or more of the selections or user inputs of methods 500, 600 and 1000 described below with reference to FIGS. 5, 6, 10A and 10B. For example, the selection data 383 may describe the user selecting one or more of the graphical elements 705, 710 and 715 described below with reference to FIG. 7. These inputs may be provided by the user 180 to the touchscreen 290 of the user service system 200. The user service system 200 may store the inputs as input data 288 and transmit the input data 288 via the network 105. The agreement system 300 may receive the input data 288 and store it in the memory 327 as selection data 383.

The accord data 385 may describe an accord associated with the user 180. For example, the accord data 385 may describe an accord between two or more users 180 to participate in a CoLease agreement. The accord data 385 may include the data described below with reference to method 600 of FIG. 6. The accord data 385 may provide evidence of the accord as provided to the touchscreen 290 of the user service system 200.

The reservation data 387 includes data describing one or more reservations for the users 180. For example, the users 180 are participants in a CoLease agreement, and the reservation data 387 describes one or more reservations for the users 180 to use the vehicle system 123 which is associated with the CoLease agreement. The reservation data 387 may be based on input data 288 received from the user service system 200 via the network 105. The reservation data 387 was described above with reference to the menu module 206 of the user service module 199. The reservation data 387 is described in more detail below with reference to FIG. 8.

The allocation data 389 includes data describing the allocation of one or more financial transactions associated with the CoLease agreement. For example, the allocation data describes different financial transactions associated with the vehicle system 123, the total cost of these transactions and how much money each participant of the CoLease agreement must pay towards the total based on one or more of the user personalized rules and the financial terms associated with the CoLease agreement.

In some implementations, one or more of the selection data 383, the accord data 385, the reservation data 387 and the allocation data 389 may include some or all of the input data 288 described above with reference to FIG. 2.

The agreement system 300 may include an agreement module 197. The agreement module 197 may include code and routines configured to provide the CoLease service. For example, the agreement module 197 may determine an effective CoLease agreement among one or more users 180, manage reservations for the participants in a CoLease agreement, synchronize user profile data 191 to the vehicle system 123 based on the reservations and the current time, and track and allocate expenses among the participants in the CoLease agreement based on the rules and terms of the CoLease agreement and the actions of participants in relation to the vehicle system 123 including their respective usage of the vehicle system 123. In some implementations, the effective agreement may be an agreement to participate in a CoLease agreement associated with the vehicle system 123.

The agreement module 197 may include a communication module 302, an accord module 303, a reservation module 304, a synchronization module 306 and an allocation module 308. The communication module 302 may be communicatively coupled to the bus 320 via signal line 322. The accord module 303 may be communicatively coupled to the bus 320 via signal line 323. The reservation module 304 may be communicatively coupled to the bus 320 via signal line 324. The synchronization module 306 may be communicatively coupled to the bus 320 via signal line 326. The allocation module 308 may be communicatively coupled to the bus 320 via signal line 328.

The communication module 302 may include code and routines configured to handle communications between the agreement module 197 and the other components of the agreement system 300. In some implementations, the communication module 302 may be stored in the memory 327 and accessible and executable by the processor 325. The communication module 302 of the agreement module 197 provides similar functionality as the communication module 202 of the user service module 199 described above with reference to FIG. 2, and so, that description will not be repeated here.

The accord module 303 may include code and routines configured to determine an effective CoLease agreement among one or more users 180. For example, the accord module 303 may include code and routines configured to perform one or more steps of the method 600 described below with reference to FIG. 6 when executed by the processor 325.

The reservation module 304 may include code and routines configured to manage reservations for the participants in a CoLease agreement. For example, the reservation module 304 may perform one or more steps of method 500 described below with reference to FIG. 5 when executed by the processor 325. The reservation module 304 may also include code and routines configured to provide some or all of the functionality described below with reference to FIG. 8. In some implementations, the reservation module 304 may manage reservations for the participants in a CoLease agreement based on the input data 288 received via the network 105 from the user service system 200. In some implementations, the reservation module 304 may form the reservation data 387 based on the input data 288 and store the reservation data 387 on the memory 327.

The synchronization module 306 may include code and routines configured to synchronize user profile data 191 to the vehicle system 123. For example, the synchronization module 306 may synchronize the user profile data 191 to the vehicle system 123 based on the reservations indicated by the reservation data 387 and a current time in the geographic area where the participants reside or where the vehicle system 123 is located. In some implementations, the synchronization module 306 may include code and routines configured to perform one or more steps of the method 500 described below with reference to FIG. 5 when executed by the processor 325. In some implementations, the synchronization module 306 may track changes to the user profile data 191 and make updates to the user profile data 191 based on the changes.

The allocation module 308 may include code and routines configured to track and allocate expenses among the participants in the CoLease agreement. For example, the allocation module 308 may allocate expenses among the participants in the CoLease agreement based on the rules and financial terms of the CoLease agreement and the actions of participants in relation to the vehicle system 123 including their respective usage of the vehicle system 123. In some implementations, the allocation module 308 may allocate expenses among the participants in the CoLease agreement based on the financial data 291 received via the network 105 from the user service system 200. In some implementations, the allocation module 308 may form the allocation data 389 based on the financial data 291 and store the allocation data 389 on the memory 327.

Figure 4:
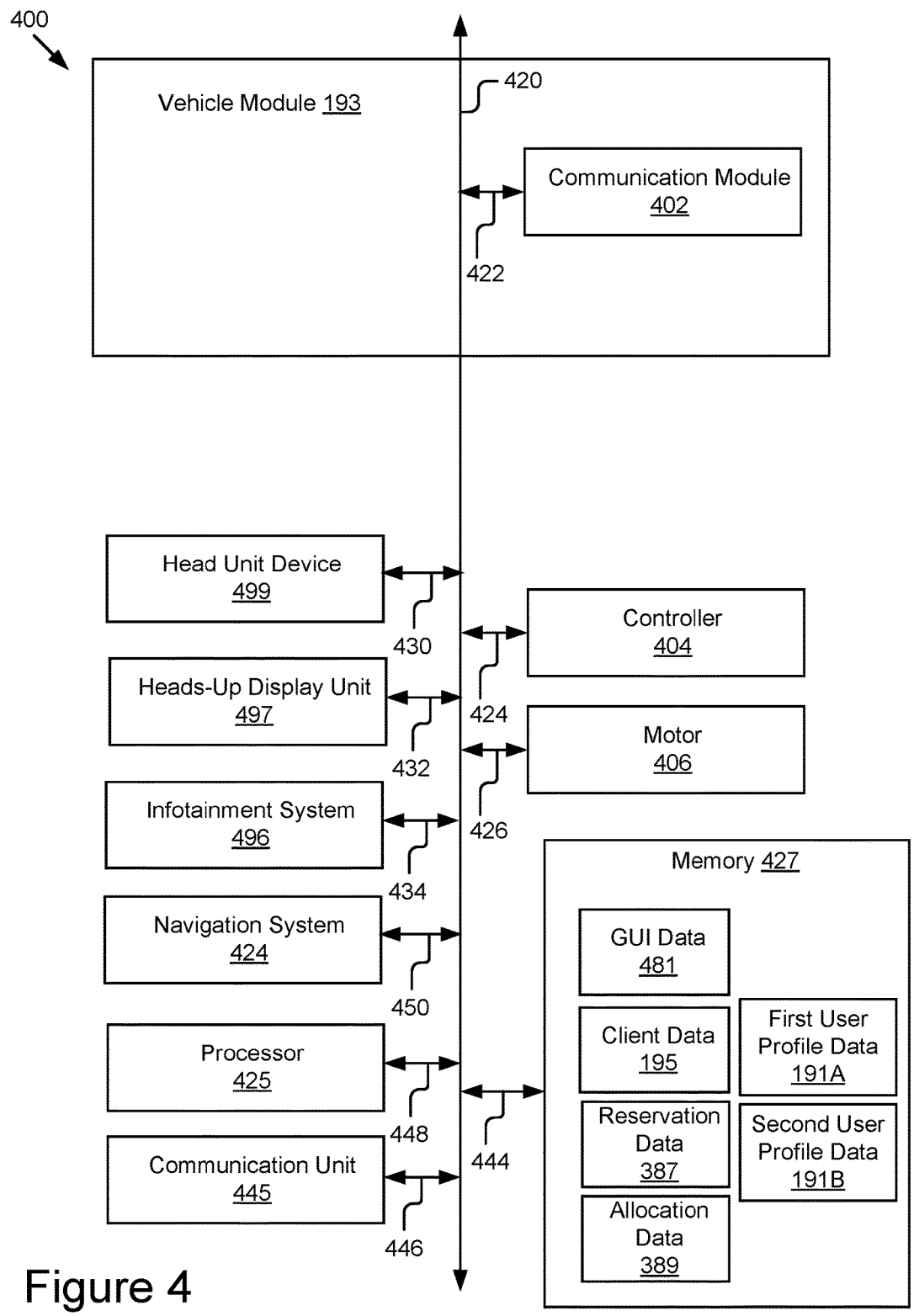
FIG. 4 is a block diagram illustrating an example vehicle service system.

Referring now to FIG. 4, an example implementation of a vehicle service system 400 is depicted. The vehicle service system 400 may include the vehicle module 193, a controller 404, a motor 406, a head unit device 499, a heads-up display unit 497, an infotainment system 496, a navigation system 424, a processor 425, a communication unit 445 and a memory 427. These elements of the vehicle service system 400 may be communicatively coupled by a bus 420. The controller 404 may be communicatively coupled to the bus 420 via signal line 424. The motor 406 may be communicatively coupled to the bus 420 via signal line 426. The head unit device 499 may be communicatively coupled to the bus 420 via signal line 430. The heads-up display unit 497 may be communicatively coupled to the bus 420 via signal line 432. The infotainment system 496 may be communicatively coupled to the bus 420 via signal line 434. The navigation system 424 may be communicatively coupled to the bus 420 via signal line 450. The processor 425 may be communicatively coupled to the bus 420 via signal line 448. The communication unit 445 may be communicatively coupled to the bus 420 via signal line 446. The memory 427 may be communicatively coupled to the bus 420 via signal line 444.

In some implementations, the vehicle service system 400 may be a processor-based computing device. For example, the vehicle service system 400 may be an onboard computer system of the vehicle system 123 described above with reference to FIG. 1.

In some implementations, the vehicle service system 400 may be a special-purpose computing device configured to generate one or more of the GUIs 700, 800, 900, 1100, 1200, 1300, 1400, 1500, 1600, 1700 described below with reference to FIGS. 7-9 and 11-17. In some implementations, the vehicle service system 400 may be a special-purpose computing device configured to receive inputs via one or more of the GUIs 700, 800, 900, 1100, 1200, 1300, 1400, 1500, 1600, 1700 and take actions responsive to these inputs. For example, the user 180 may provide an input to a calendar GUI 1100 described below with reference to FIG. 11, and the vehicle service system 400 may receive this input and take action responsive to this input. In some implementations, the vehicle service system 400 may be a special-purpose computing device configured to provide some or all of the functionality described below with reference to one or more of the GUIs 700, 800, 900, 1100, 1200, 1300, 1400, 1500, 1600, 1700.

The processor 425, the communication unit 445 and the memory 427 include similar functionality as the processor 225, the communication unit 245 and the memory 227 described above with reference to FIG. 2, and so, these descriptions will not be repeated here.

The vehicle service system 400 may be a special-purpose computing device configured to perform one or more steps of the methods 500, 600, 1000 described below with reference to FIGS. 5, 6 and 10.

The motor 406 may be an electric motor. The motor 406 may be an element of a vehicle. For example, the motor 406 may be an element of the vehicle system 123. In some implementations the motor 406 is a servo motor or some other electric motor. Although only one motor 406 is depicted in FIG. 4, in practice the vehicle service system 400 may include one or more motors 406.

In some implementations, the motors 406 may be installed in the vehicle to control one or more ergonomic settings of the vehicle. For example, the driver's seat of the vehicle may include one or more motors to control the ergonomic configuration of the driver's seat.

The controller 404 may be a controller for controlling the operations of the motors 406. The vehicle may include one or more controllers 404. The controller 404 may use the user profile data 191 to reconfigure the ergonomic configuration of the vehicle based on the ergonomic settings indicated by the user profile data 191. For example, assume that a first user 180A had previously traveled in the vehicle system 123 from 12:00 PM to 1:30 PM and that a second user 180B having different ergonomic settings was scheduled to travel in the vehicle from 1:30 PM to 3:00 PM. The first user 180A may park the vehicle system 123 at 1:25 PM. The agreement module 197 may determine that the second user 180B has reserved time to drive the vehicle starting at 1:30 PM. The agreement module 197 may transmit the second user profile data 191B to the vehicle system 123 via the network 105. The vehicle system 123 may include the vehicle service system 400. The vehicle service system 400 may receive the second user profile data 191B and store the second user profile data 191B on the memory 427. The agreement module 197 may also transmit a signal indicating that the vehicle system 123 should be reconfigured based on the second user profile data 191B responsive to the pending reservation of the second user 180B. The vehicle module 193 of the vehicle service system 400 may retrieve the second user profile data 191B. The vehicle module 193 may use the controller 404 to drive the motors 406 to reconfigure the ergonomic settings of the vehicle system 123 based on the second user profile data 191B. For example, the driver's seat of the vehicle may be reconfigured to a distance away from the steering wheel that matches or is similar to the distance that is preferred by the second user 180B as indicated by the second user profile data 191B. The controller 404 and the motor 406 may reconfigure other elements of the vehicle so that the vehicle has the same or similar ergonomic settings which are preferred by the second user 180B.

The head unit device 499 may include a hardware device configured to provide the user 180 control of entertainment media and network services provided by the vehicle service system 400. For example, the vehicle service system 400 is an element of the vehicle system 123 and the head unit device includes functionality to enable the user 180 to control the streaming of content from the content server 107 via the network 105. The content may include one or more network services.

The heads-up display unit 497 may include hardware for displaying three-dimensional (3D) graphical data in front of a user such that they do not need to look away from the road to view the graphical data. For example, the heads-up display unit 497 may include a physical screen or it may project the graphical data onto a transparent film that is part of the windshield of the vehicle system 123 or part of a reflector lens. In some implementations, the heads-up display unit 497 is included as part of the vehicle system 123 during the manufacturing process or is later installed. In other implementations, the heads-up display unit 497 is a removable device. In some implementations, the graphical data may adjust a level of brightness to account for environmental conditions, such as night, day, cloudy, brightness, etc.

The graphical data used by the heads-up display unit 497 may be stored on the memory 427. For example, the graphical data used by heads-up display unit 497 may be included in the GUI data 481 stored on the memory 427. The heads-up display unit 497 may receive graphical data for display from the vehicle module 193 or the communication unit 445. For example, the heads-up display unit 497 receives GUI data 481 to cause the heads-up display unit 497 to display two dimensional or three dimensional renderings of one or more of the GUIs 700, 800, 900, 1100, 1200, 1300, 1400, 1500, 1600, 1700 described below with reference to FIGS. 7-9 and 11-17. The heads-up display unit 497 may display graphics as three-dimensional Cartesian coordinates (e.g., with x, y, z dimensions).

The infotainment system 496 may include an in-vehicle infotainment (IVI) system. The infotainment system 496 may include one or more hardware devices to provide one or more of the following: audio entertainment; audiovisual entertainment; automotive navigation; and one or more network services. The content provided by the infotainment system 496 may be locally stored on the memory 427 or streamed to vehicle service system 400 via the network 105. For example, the vehicle service system 400 is included in the vehicle system 123 and the infotainment system 496 streams one or more network services from the content server 107 via the network 105.

The navigation system 424 may include an automotive navigation system configured to provide a navigation service. For example, the navigation system 424 may provide one or more of navigation instructions, maps, points of interest, ratings for points of interest and reviews for points of interest. In some embodiments, the navigation system 424 may be an element of the infotainment system 496 or the head unit device 499.

As illustrated in FIG. 4, the memory 427 stores GUI data 481, client data 195 reservation data 387, allocation data 389, first user profile data 191A and second user profile data 191B. The client data 195, the first user profile data 191A and the second user profile data 191B were described above with reference to FIG. 1, and so, these descriptions will not be repeated here. The reservation data 387 and the allocation data 389 were described above with reference to FIG. 3, and so these descriptions will also not be repeated here. The GUI data 481 may include similar data as the GUI data 289 described above with reference to FIG. 2, and so, this description will not be repeated here.

One or more of the head unit device 499, infotainment system 496 and the navigation system 424 may include a touchscreen for receiving inputs and selections from a user 180. The inputs and selections may be described by input data or selection data stored on the memory 427 by the communication unit 445 or the communication module 402.

In some implementations, the vehicle module 193 may include code and routines configured to generate one or more of the GUIs 700, 800, 900, 1100, 1200, 1300, 1400, 1500, 1600, 1700 described below with reference to FIGS. 7-9 and 11-17 using the GUI data 481. In some implementations, the vehicle module 193 may include code and routines configured to receive inputs via one or more of the GUIs 700, 800, 900, 1100, 1200, 1300, 1400, 1500, 1600, 1700 and take actions responsive to these inputs. For example, the user 180 may provide an input to a calendar GUI 1600 described below with reference to FIG. 16 using a touchscreen of the infotainment system 496. The vehicle module 193 may take action responsive to this input. In some implementations, the vehicle module 193 may include code and routines configured to provide some or all of the functionality described below with reference to one or more of the GUIs 700, 800, 900, 1100, 1200, 1300, 1400, 1500, 1600, 1700.

In some implementations, the vehicle module 193 may include code and routines configured to perform one or more steps of the methods 500, 600, 1000 described below with reference to FIGS. 5, 6, 10A and 10B when executed by the processor 425.

In some implementations, the vehicle module 193 may include a communication module 402. The communication module 402 may be code and routines configured to handle communications between the vehicle module 193 and the other components of the vehicle service system 400. In some implementations, the communication module 402 may be stored in the memory 427 and accessible and executable by the processor 425. The communication module 402 may be communicatively coupled to the bus 420 via signal line 422. The communication module 402 of the vehicle module 193 provides similar functionality as the communication module 202 of the user service module 199 described above with reference to FIG. 2, and so, that description will not be repeated here.

Figure 5:
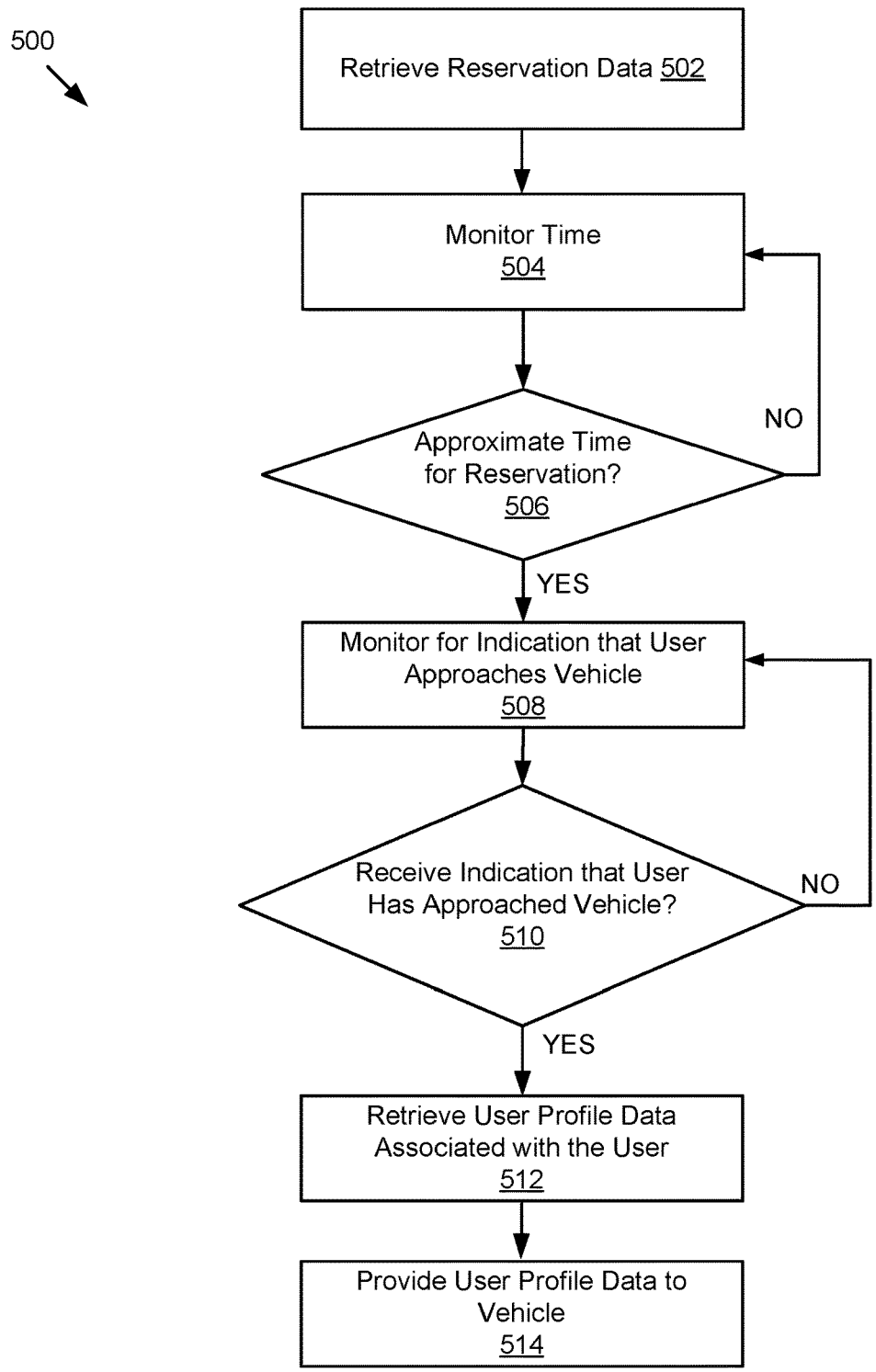
FIG. 5 is a flowchart of an example method for synchronizing user profile data for a vehicle.

FIG. 5 is a flowchart of an example method 500 for synchronizing user profile data for a vehicle. In some implementations, the method 500 may be implemented by the agreement module 197.

At block 502, reservation data may be retrieved.

At block 504 the time may be monitored. The time may be the current time in the geographic location where a vehicle associated with the reservation data is located. At block 506 a determination is made regarding whether the current time is an approximate time for the start of a reservation. In some implementations, the agreement module 197 may be configured to synchronize or prepare to synchronize the user profile data 191 associated with a user 180 at a threshold amount of time preceding the start of the user's 180 reservation for a vehicle. For example, the user profile data 191 may be synced for the vehicle five minutes before the start of the reservation. Alternatively, the user profile data 191 may be retrieved from a memory and prepared for synchronization. For example, the user profile data 191 may be stored in a buffer.

If the approximate time for the reservation is not met at block 506, then the method 500 may return to block 504. If the approximate time for the reservation is met at block 506, then the method 500 may proceed to block 508.

Block 508 may include monitoring for an indication that a user 180 associated with the reservation is approaching the vehicle associated with the reservation. For example, a client 103 associated with the user 180 associated with the reservation may pair with the vehicle associated with the reservation. The pairing may include the client 103 and the vehicle pairing via Bluetooth®, Bluetooth® LE or any other wireless protocol. Responsive to the pairing, the vehicle module 193 or the user service module 199 may transmit the indication that the user 180 associated with the reservation is approaching the vehicle associated with the reservation.

At block 510, a determination may be made regarding whether the indication that a user 180 associated with the reservation is approaching the vehicle associated with the reservation has been received. If the indication has not been received, then the method 500 may return to block 508. If the indication has been received, then the method may proceed to block 512.

At block 512, the user profile data for the user 180 associated with the reservation may be retrieved.

At block 514, the user profile data may be transmitted to the vehicle. The vehicle service system 400 may then take steps to reconfigure the vehicle based on the user profile data 191 for the user 180 associated with the reservation.

Figure 6:
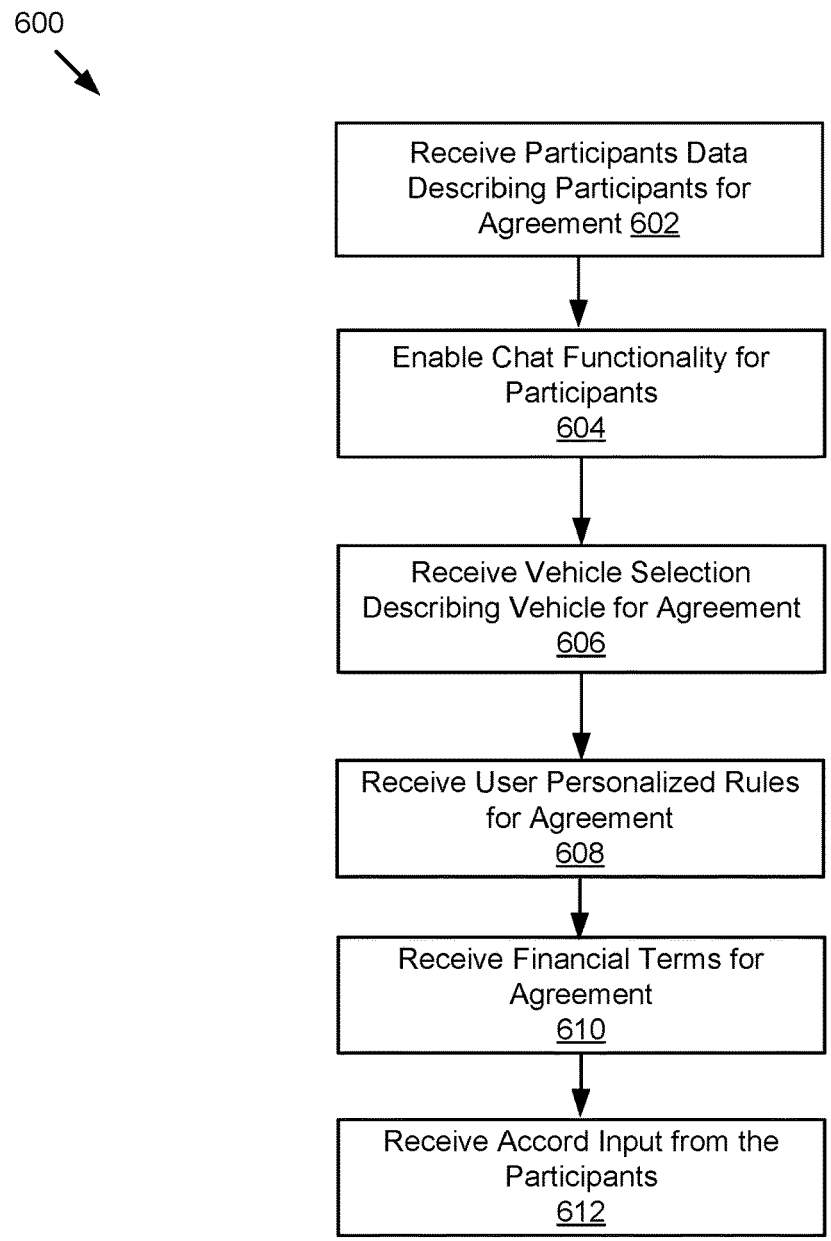
FIG. 6 is a flowchart of an example method for establishing a CoLease agreement.

Referring now to FIG. 6, depicted is a flowchart of an example method 600 for establishing a CoLease agreement. In some implementations, the agreement system 300 may perform one or more steps of the method 600. In some implementations, the memory 327 stores some or all of the data described below with reference to the method 600.

At block 602, the participant data may be received. The participant data may describe or identify one or more users 180 that may participate in the CoLease agreement. For example, the participant data may include the email address for one or more users 180 or an identifier used to begin a chat with the one or more users 180. The participant data may also include one or more of the following: a name for one or more of the users 180; a social security number for one or more of the users 180; a physical address for one or more of the users 180; a telephone number for one or more of the users 180; for one or more of the users 180, a driver's license number and the identity of the issuing state for the driver's license; and vehicle insurance information including a policy number for one or more of the users 180. The user's 180 may be referred to as participants for the purpose of clarity in identifying that they are participating in a CoLease agreement with each other, or to identify that they are potential participants in a CoLease agreement.

At block 604, the chat functionality for the participants may be enabled. For example, the agreement server 109 cooperates with the chat server 113 to enable private chats among the users 180 who provided participant data in block 602. The one or more users 180 may use the chat functionality to discuss which vehicle they would like to associate with the CoLease agreement and different rules and financial terms that may be associated with the CoLease agreement. The participants may also discuss their interest in the CoLease agreement and make a decision about whether they want to continue the process of participating in an effective CoLease agreement.

At block 606, a vehicle selection may be received. The vehicle selection may describe a vehicle system 123 to be associated with the CoLease agreement for one or more of users 180 that provided participant data at block 602. For example, the vehicle selection may describe a vehicle which will be shared among the participants as part of the CoLease agreement. In some embodiments, one or more of the users 180 who provided participant data at block 602 may have decided to discontinue the process of participating in an effective CoLease agreement.

At block, 608, one or more user personalized rules may be received. The user personalized rules may be rules or terms that are written by the one or more users who provided participant data at block 602. For example, one of the participants may have a preference that the vehicle be parked at night under a street light. This participant may provide text inputs describing this rule. The rule may include a consequence for breaking the rule. The participants may use the chat functionality to discuss this rule. They may edit the rule, leave it as is, or decide to remove the rule. In this way the participants may negotiate among themselves regarding which personalized rules should be included in the CoLease agreement and what content should be included in these rules.

At block 610, financial terms for the CoLease agreement may be received. The financial terms may describe one or more of the following: a term of the CoLease; a financial cost for being a participant in the CoLease based on the vehicle selection and the term of the CoLease (this may be a monthly fee); a percentage of vehicle use each participant is entitled to per week (or some other time period); a percentage of the cost of the CoLease agreement will be paid by each participant (this percentage may correct to the percentage of vehicle each participant is entitled to per week, or some other time period); a percentage of vehicle fuel and maintenance costs will be paid by each participant; and the identity of one or more participants that will be responsible for ensuring that vehicle maintenance is performed, etc.

At block 612, one or more of the participants may provide an accord input indicating that they agree to enter into the CoLease agreement with the other participants, that they agree to the vehicle selection, and that they agree to the user personalized rules and the financial terms. The participants may provide the accord input via a touchscreen 290 of the user service system 200. The accord input may include a handwritten electronic signature inputted to the touchscreen.

In some implementations, the agreement system 300 may determine that there is an effective CoLease agreement responsive to receiving the accord input from each of the participants.

In some implementations, some or all of the data described above with reference to method 600 of FIG. 6 may be included in the accord data 385 stored in the memory 327.

In some implementations, when a participant attempts to book a reservation for the vehicle, the agreement system 300 may analyze what percentage of vehicle use each participant is entitled to per week (or some other time period) according to the financial terms included in the accord data 385. If the participant requesting the reservation has already used the vehicle in an amount meeting or exceeding their allocation, the agreement system 300 may require that the other participants consent to the reservation before booking the reservation. In this way the agreement module 197 of the agreement system 300 may include code and routines configured to enforce the rules and terms of the CoLease agreement. The terms or rules of the CoLease agreement may also include instructions for how the agreement system 300 may enforce the rules and terms of the CoLease agreement and the agreement system 300 may enforce the rules and terms in accordance with these instructions.

Figure 8:
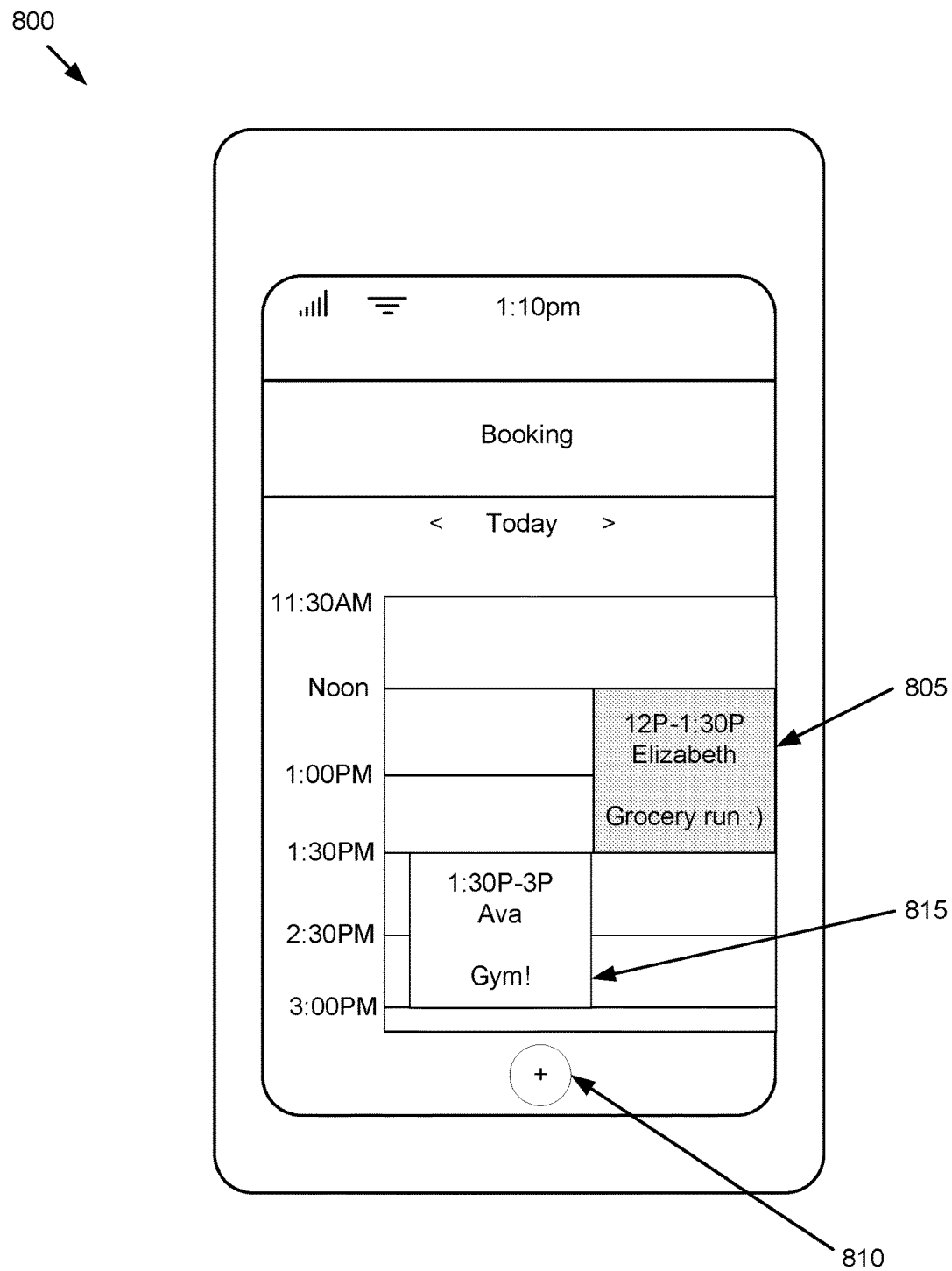
FIG. 8 is a graphic representation of an example booking graphical user interface.
Figure 9A:
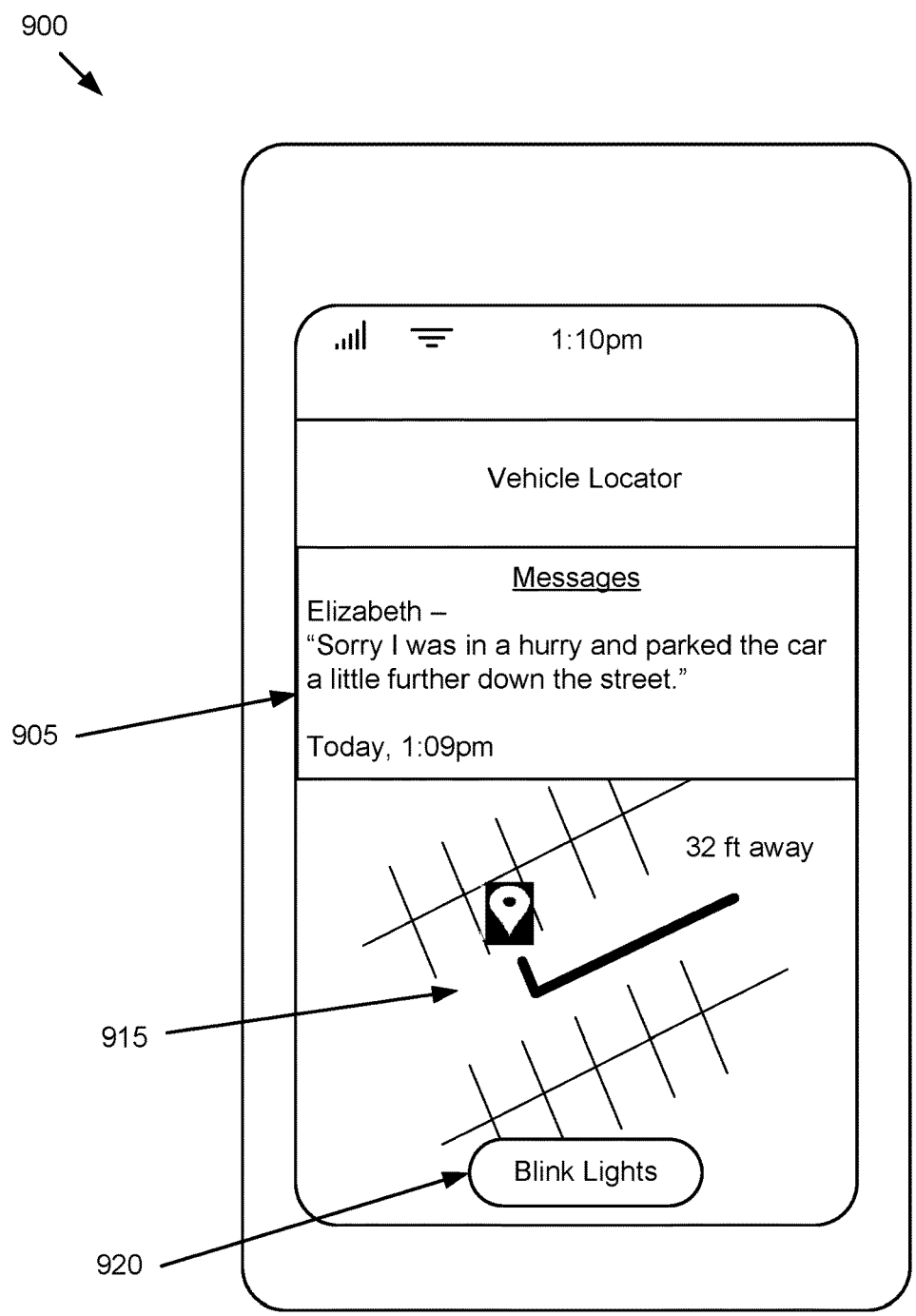
FIGS. 9A and 9B are graphic representations of an example vehicle locator graphical user interface.
Figure 9B:
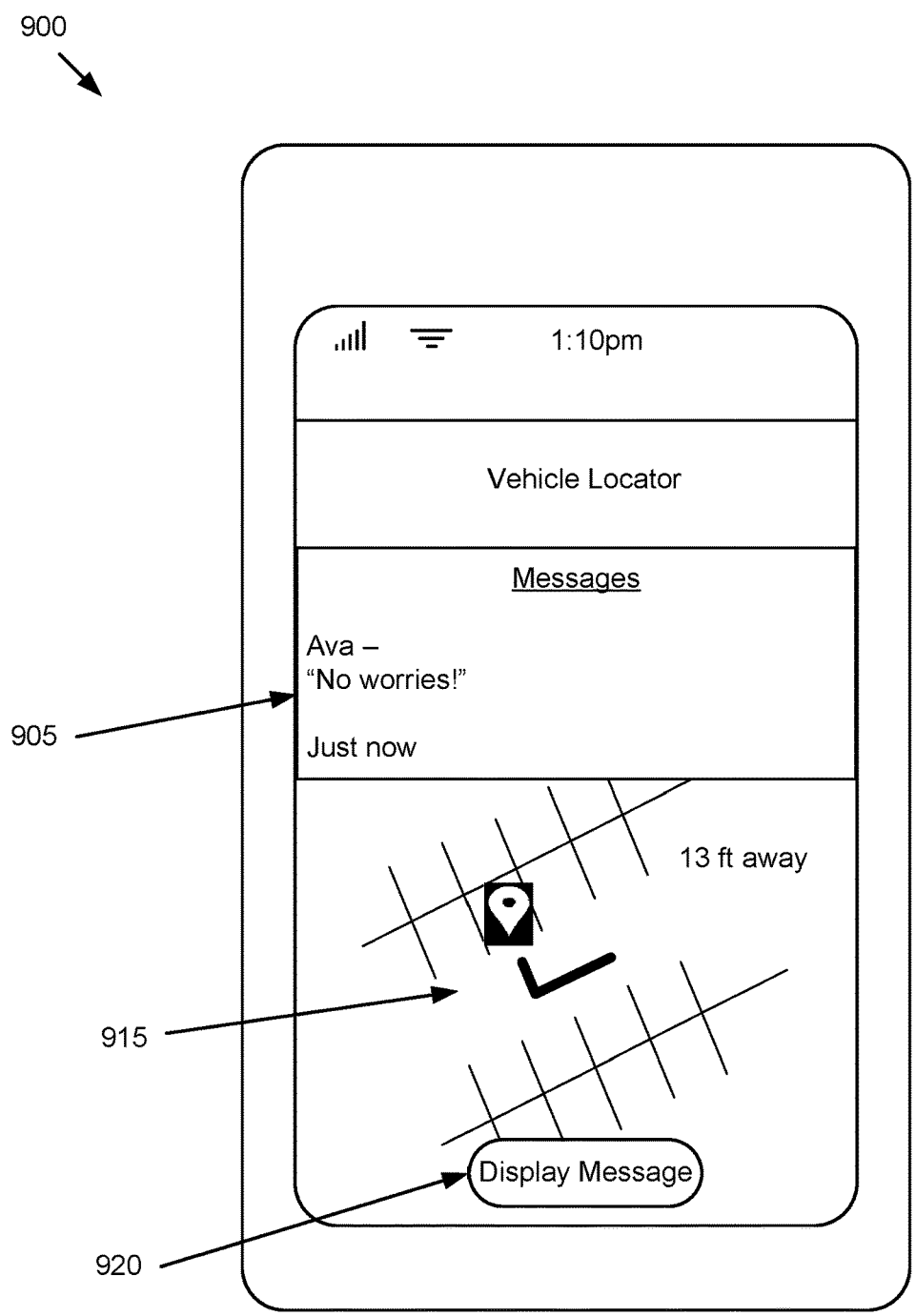
Figure 14:
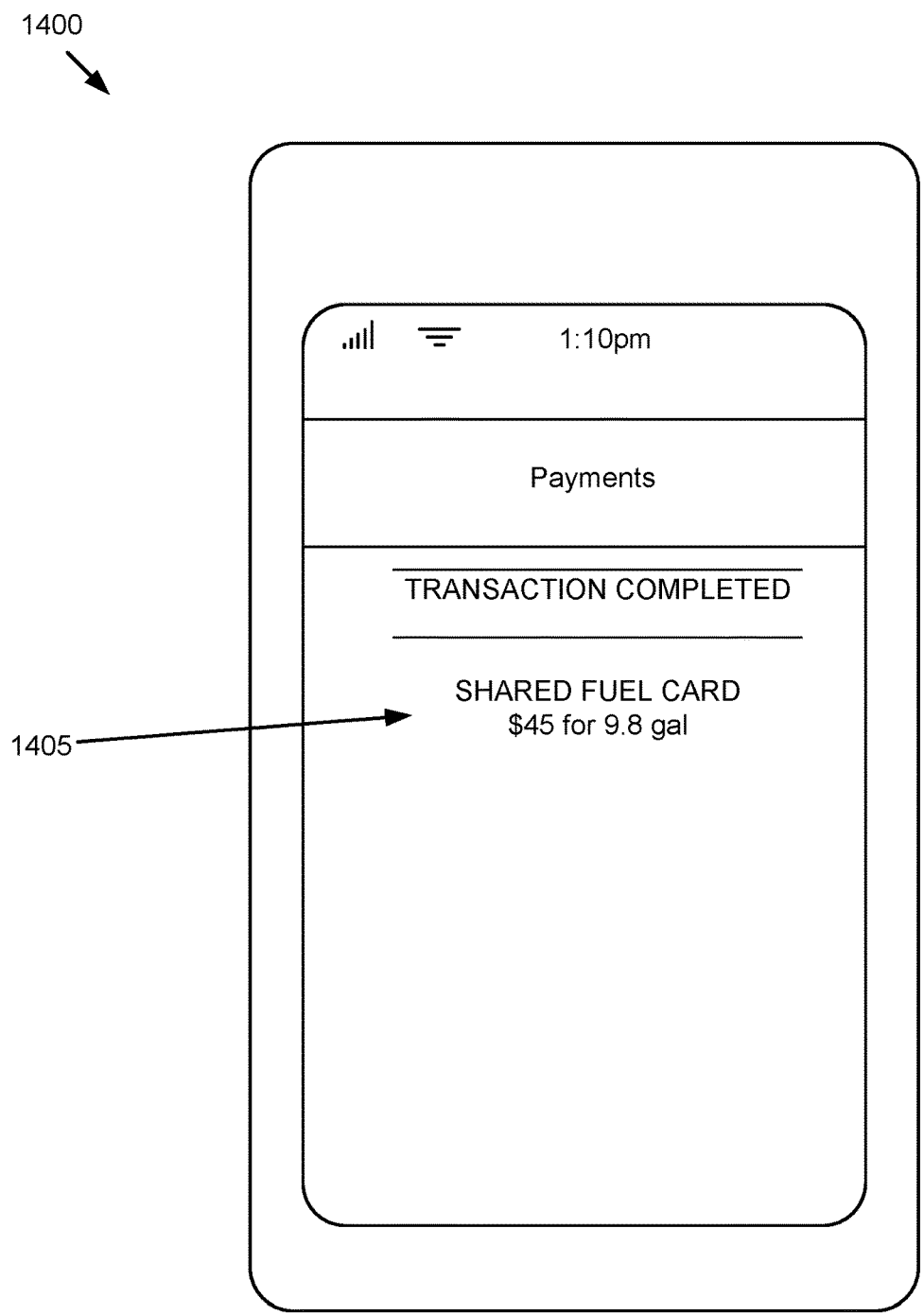
FIG. 14 is a graphic representation of an example vehicle function payment graphical user interface.

Referring now to FIG. 7, depicted is a graphic representation of an example CoLease menu GUI 700. In some implementations, the graphical elements 705, 710, 715 of the CoLease menu GUI 700 are configured to be selectable by a user 180 via a touchscreen. Graphical element 705 is configured to be selectable by the user 180 to open the booking GUI, an example of which is depicted in FIG. 8. Graphical element 710 is configured to be selectable by the user 180 to open the vehicle locator GUI, an example of which is depicted in FIGS. 9A and 9B. Graphical element 715 is configured to be selectable by the user to open the vehicle function payment GUI, an example of which is depicted in FIG. 14.

Referring now to FIG. 8, depicted is a graphic representation of an example booking GUI 800. In some implementations, the graphical elements 805, 810, 815 of the vehicle function payment GUI 800 are configured to be selectable by a user 180 via a touchscreen. The booking GUI 800 includes a calendar depicting any number of reservations for the participants in a CoLease agreement.

In some implementations, all of the reservations viewable by the booking GUI 800 are associated with participants for the same CoLease agreement. In this way, reservations may be privately viewable among the participants of the same CoLease agreement, and not viewable by other users who are not participants in this particular CoLease agreement. In some embodiments, accessing the booking GUI 800 requires the participants to provide a secret. For example, a participant must provide a password before accessing the booking GUI 800.

Graphical element 805 includes a reservation for a participant named "Elizabeth" and lasting ninety minutes from 12:00 PM until 1:30 PM. The other participants in Elizabeth's CoLease agreement may view this reservation via the booking GUI 800, whereas other users who are not participants in Elizabeth's CoLease agreement may not view any of the reservations depicted in the booking GUI 800.

Assume that the participant named "Ava" does not current have a reservation. Ava may view the booking GUI 800 and observe that Elizabeth has a reservation lasting from 12:00 PM until 1:30 PM. Ava may select graphical element 810 to indicate that she would like to book a reservation. For example, Ava may touch graphical element 810 on the touchscreen 290 of the client 103 to begin booking a reservation. After selecting graphical element 810, Ava may select a region of the calendar and provide one or more inputs to indicate the start time for her reservation, the end time for her reservation and, optionally, a note to indicate the purpose of the reservation. These inputs may then be transmitted from the user service system 200 to the agreement system 300 to book the reservation.

In some implementations, the agreement system or the user service system 200 will provide a participant with an error message if they attempt to book a reservation that conflicts with another participant's reservation. For example, in FIG. 8 Ava could not book a reservation beginning at 1:00 PM since it would conflict with Elizabeth's pre-existing reservation.

Graphical element 815 includes a reservation for Ava lasting ninety minutes from 1:30 PM until 3:00 PM.

Referring now to FIGS. 9A and 9B, depicted are graphic representations of an example vehicle locator GUI 900. For example, the user 180 may carry the client 103. The client 103 may be a smartphone. The Bluetooth® antenna of the client 103 may be activated. The Bluetooth® antenna of the client 103 may be configured to be discoverable by another Bluetooth® enabled device. The user 180 may be attempting to locate the vehicle associated with the effective CoLease agreement. The user service module 199 may use GPS or wireless signal triangulation to locate the vehicle and display the location of the vehicle on an electronic map. The Bluetooth® antenna of the vehicle may be activated. The client 103 and the vehicle may pair via Bluetooth® responsive to the client 103 coming within range of the Bluetooth® antenna of the vehicle. Responsive to detecting the pairing of the client 103 and the vehicle, the vehicle module 193 may cause the headlights or brake lights of the vehicle to blink so that the user 180 may identify the location of the vehicle. The blinking of the vehicle lights may be beneficial, for example, if the vehicle is among many other vehicles and hard to identify among the other vehicles. In some implementations, GPS may be imprecise and the blinking of the vehicle lights may assist the user 180 to identify the vehicle. The vehicle module 193 may be configured to sound a horn of the vehicle contemporaneous to blinking the vehicle lights.

In some implementations, the heads-up display unit 497 of the vehicle includes a graphical display panel configured to face outwards, i.e., facing outside the vehicle and away from the interior cabin so that the graphical display is viewable outside of the vehicle. In some implementations, the outward facing graphical panel of the heads-up display unit 497 may be configured to display a personalized greeting for the user 180 responsive to the vehicle module 193 detecting the pairing of the vehicle and the client 103 via Bluetooth®. For example, the outward facing graphical panel may display a message similar to the personalized welcome GUI 1200 depicted in FIG. 12. In some implementations, responsive to the pairing of the vehicle and the client 103 via Bluetooth®, the user profile data 191 associated with the user 180 may be provided to the vehicle via the network 105. The vehicle module 193 may include graphical data for a template welcome GUI that is personalized based on the name of the user 180 as indicated by the user profile data 191. In some implementations, the user profile data 191 is provided to the vehicle responsive to other events. For example, the user profile data 191 may be provided to the vehicle by the agreement module 197 responsive to the current time corresponding to a reservation for the user 180.

In some implementations, the form of Bluetooth® used by the vehicle and the client 103 may be Bluetooth® LE. The vehicle may be configured to include an auxiliary battery for powering the Bluetooth® antenna of the vehicle.

In some implementations, the functionality described above for locating the vehicle and causing the blinking of the vehicle lights or provide a personalized message on the outward facing graphical panel may use Wi-Fi or some other form of wireless communication instead of Bluetooth® or in combination with Bluetooth®. For example, Wi-Fi triangulation may be used instead of Bluetooth®.

Referring to FIG. 9A, graphical element 905 may display a chat window for enabling the participants of the CoLease agreement to communicate with one another. For example, assume that Elizabeth and Ava are participants in a CoLease agreement together. Further assume that Elizabeth has a reservation for the vehicle from 12:00 PM until 1:30 PM and that Ava has a reservation from 1:30 PM until 3:00 PM. Elizabeth may send a message to Ava to indicate that she parked the vehicle in a different location than Ava may have expected. For example, the rules or terms of the CoLease agreement may regulate where the vehicle should be parked, and Elizabeth may be sending Ava a message using graphical element 905 to inform Ava that the vehicle is in an unexpected location.

Graphical element 915 may display a real time or near real time indication of how far the client 103 is from the vehicle. For example, the client 103 may be a smartphone associated with Ava. Ava may be looking for the vehicle using the vehicle locator GUI 900. In this example, graphical element 915 may indicate that the client 103 is 32 feet away from the vehicle.

Graphical element 915 may display an electronic map that depicts the relative location of the vehicle and the client 103 and a path that may be taken by the user 180 in order to locate the vehicle. Graphical element 915 may be updated in real time or near real time. For example, with reference to FIG. 9B, graphical element 915 may be updated in FIG. 9B to indicate that the client 103 is 13 feet away from the vehicle.

Referring back to FIG. 9A, graphical element 920 may be a graphical button selectable by the user 180 to configure whether the vehicle will blink its lights or display a message on the outward facing graphical panel. In this example the graphical element 920 is configured so that the vehicle will blink its lights when the client 103 pairs with the vehicle.

Referring to FIG. 9B, the graphical element 920 in this example shows that the user 180 has selected to receive a message on the outward facing graphical panel. The user service module 199 may transmit the selection of the user 180 to the vehicle via the network 105 so that the vehicle module 193 takes action corresponding to the selection. Graphical element 905 is updated in FIG. 9B to show that Ava has responded to Elizabeth's earlier message shown in FIG. 9A.

Figure 10A:
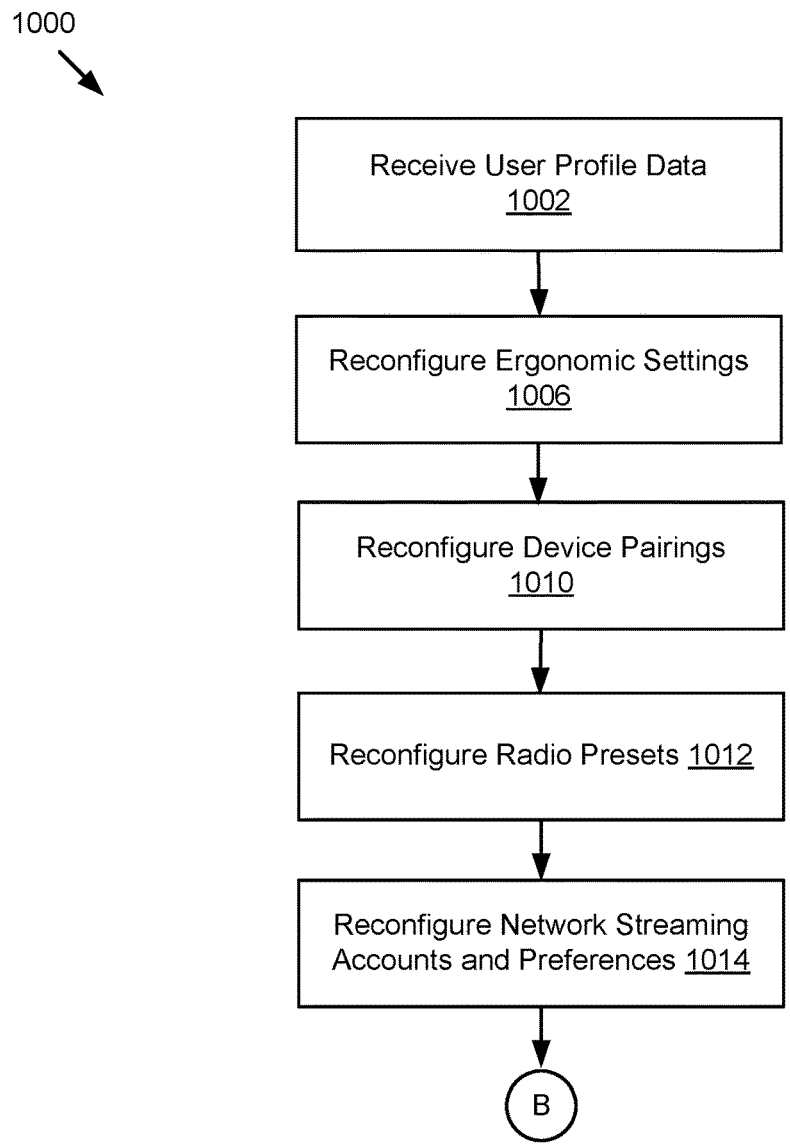
FIGS. 10A and 10B are a flowchart of an example method for reconfiguring a vehicle system based on the user profile data.
Figure 10B:
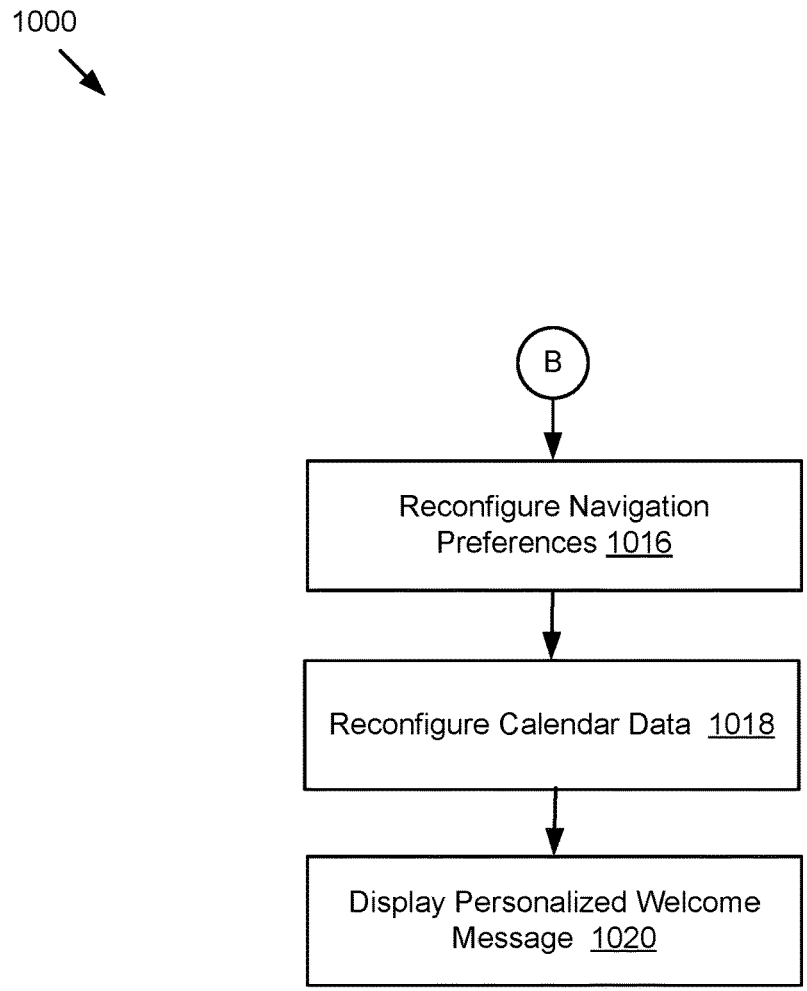

Referring now to FIGS. 10A and 10B, depicted is a flowchart of an example method 1000 for reconfiguring a vehicle system 123 based on the user profile data 191. At block 1002 the user profile data 191 may be received. At block 1006 the ergonomic settings for the vehicle system 123 may be reconfigured based on the user profile data 191. At block 1010 the device pairings for the vehicle may be reconfigured based on the user profile data 191. At block 1012 the radio presets may be reconfigured based on the user profile data 191. At block 1014, the network streaming accounts and preferences may be reconfigured based on the user profile data 191.

Referring now to FIG. 10B, at block 1016 the navigation preferences may be reconfigured based on the user profile data 191. At block 1018, the calendar data may be reconfigured based on the user profile data 191. At block 1020, a personalized welcome message 1020 may be displayed based on the user profile data 191.

Figure 11:
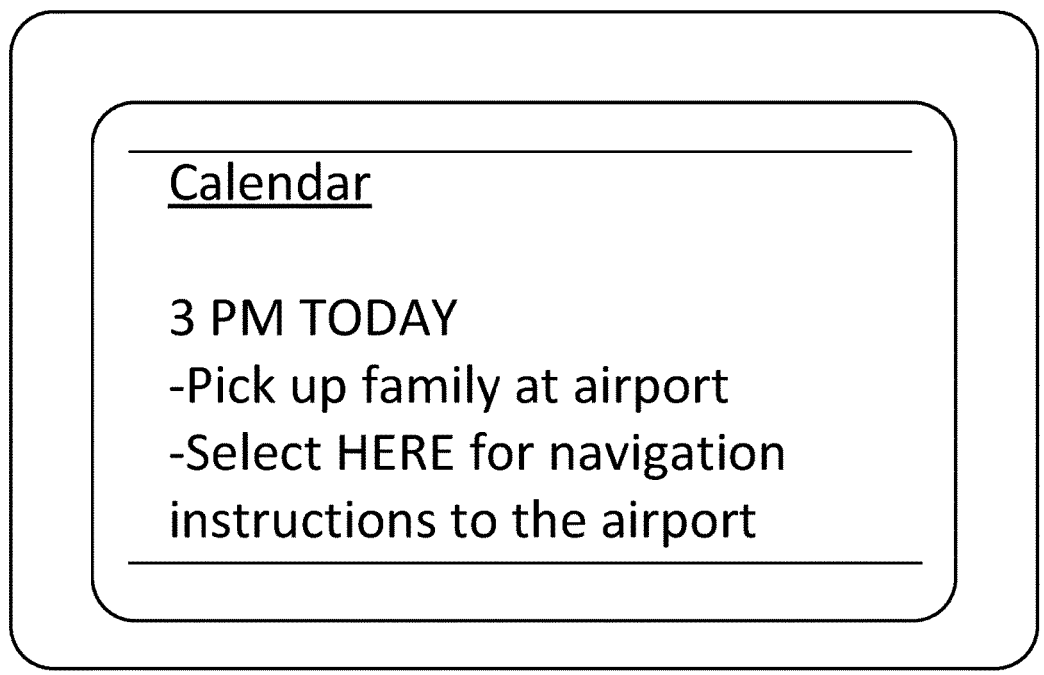
FIG. 11 is a graphic representation of an example calendar graphical user interface.

Referring now to FIG. 11, depicted is a graphic representation of an example calendar GUI 1100. The calendar GUI 1100 may be displayed, for example, on a touchscreen display of the vehicle system 123. The calendar GUI 1100 may be personalized for the user 180 having the vehicle system 123 reserved for the given time. For example, the calendar GUI 1100 may display one or more electronic calendars associated with the network services for the user 180. The calendar GUI 1100 may be configured to include graphical elements that are selectable by the user 180 touching the touchscreen. For example, in the depicted example of FIG. 11 the user 180 may select a portion of the calendar GUI 1100 to receive navigation instructions to the airport, which may be context specific to the calendar entry "Pick up family at airport." In this way the vehicle module 193 includes code and routines configured to determine and generate context specific navigation instructions for the calendar GUI 1100 based on the data included in the calendar entry.

Figure 12:
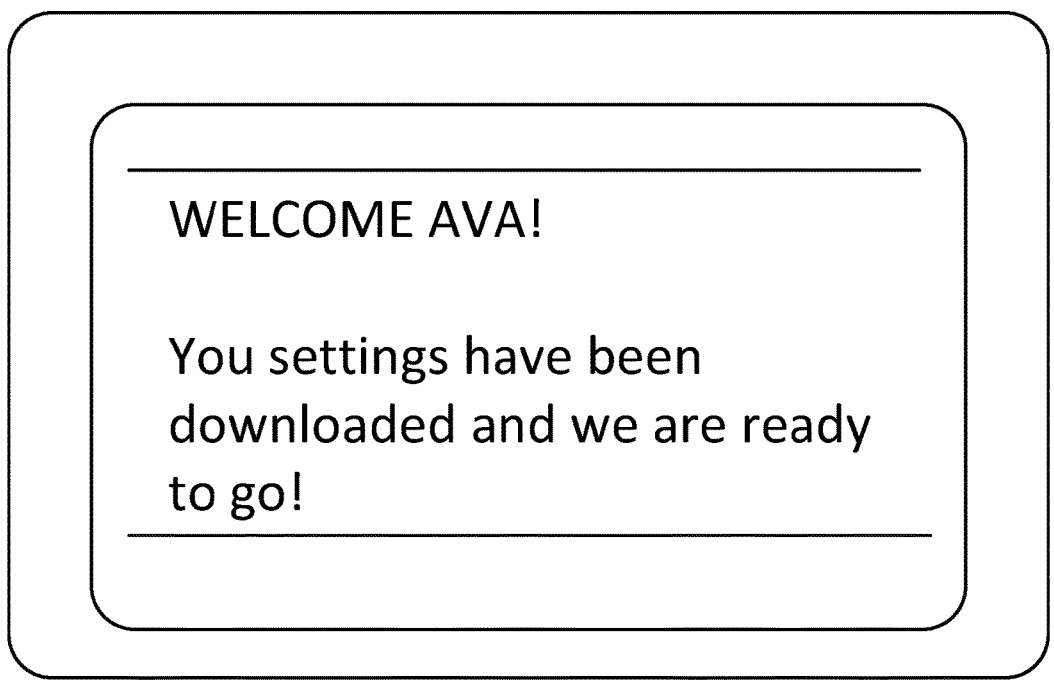
FIG. 12 is a graphic representation of an example personalized user welcome graphical user interface.

Referring now to FIG. 12, depicted is a graphic representation of an example personalized user welcome GUI 1200. The personalized user welcome GUI 1200 may be displayed, for example, on a touchscreen display of the vehicle system 123 or the outward facing panel of the heads-up display unit 497. The personalized user welcome GUI 1200 may be personalized for the user 180 having the vehicle system 123 reserved for the given time. For example, the personalized user welcome GUI 1200 may display the name of the user 180 based on the user profile data 191. The personalized user welcome GUI 1200 may be configured to include graphical elements that are selectable by the user 180 touching the touchscreen.

Figure 13:
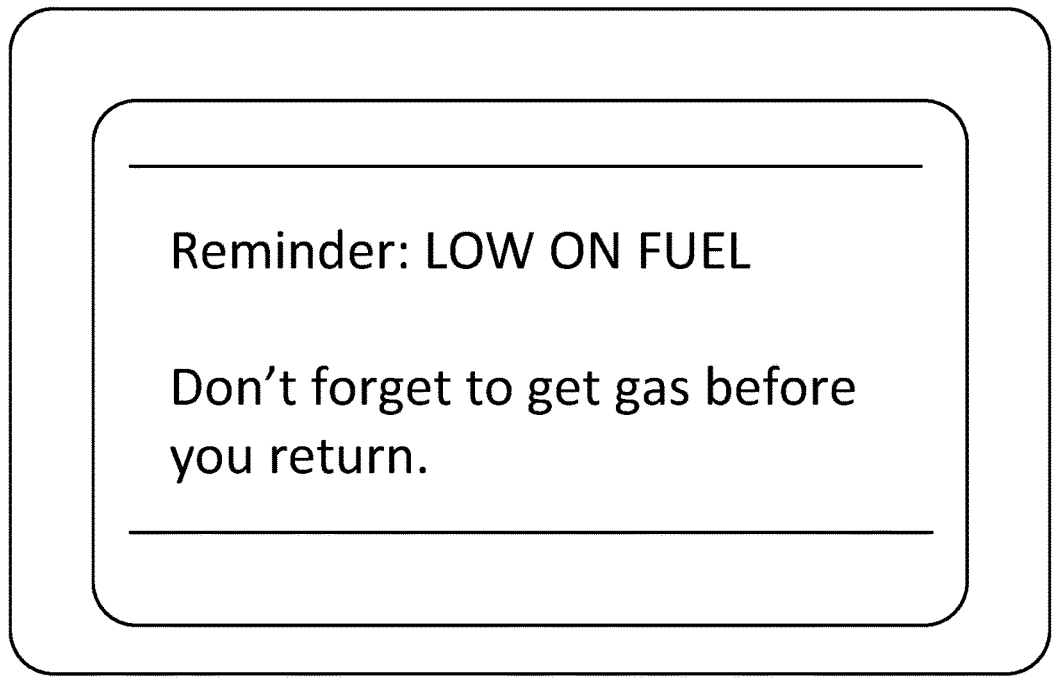
FIG. 13 is a graphic representation of an example vehicle function reminder graphical user interface.

Referring now to FIG. 13, depicted is a graphic representation of an example vehicle function reminder GUI 1300. The vehicle function reminder GUI 1300 may be displayed, for example, on a touchscreen display of the vehicle system 123. The vehicle function reminder GUI 1300 may display information describing a vehicle function that requires the attention of the user 180. In some implementation, the vehicle function reminder GUI 1300 may be based in part on the reservation data 387. For example, the vehicle module 193 may include code and routines configured to determine that another reservation follows the present reservation based on the reservation data 387, and that based on the current fuel level the present user 180 of the vehicle should be provided with vehicle function reminder GUI 1300 to remind the present user 180 to refuel the vehicle. In some implementations, the reservation data 387 may include an indication of the destination of the next reservation or the next user 180, and the vehicle module 193 may determine that given the context of the destination and the present fuel level, a vehicle function reminder GUI 1300 should be provided to remind the present user 180 to refuel the vehicle.

Referring now to FIG. 14, depicted is a graphic representation of an example vehicle function payment GUI 1400. Graphical element 1405 includes a description of a completed transaction using a shared fuel card associated with the participants of the CoLease agreement. For example, the NFC module of the client 103 is used to electronically pay for fuel and the vehicle function payment GUI 1400 is displayed on the client 103 to indicate the payment.

Referring now to FIG. 15, depicted is a graphic representation of an example booking reminder GUI 1500. The booking reminder GUI 1500 may be displayed, for example, on a touchscreen display of the vehicle system 123. The booking reminder GUI 1500 may display information describing a reminder that the present user 180 of the vehicle system 123 should begin to return home, based on one or more of the current geographic locations of the vehicle system 123, the distance from the current geographic location of the vehicle system 123 to the geographic location of the home, and the start time for the next booked reservation.

Figure 16:
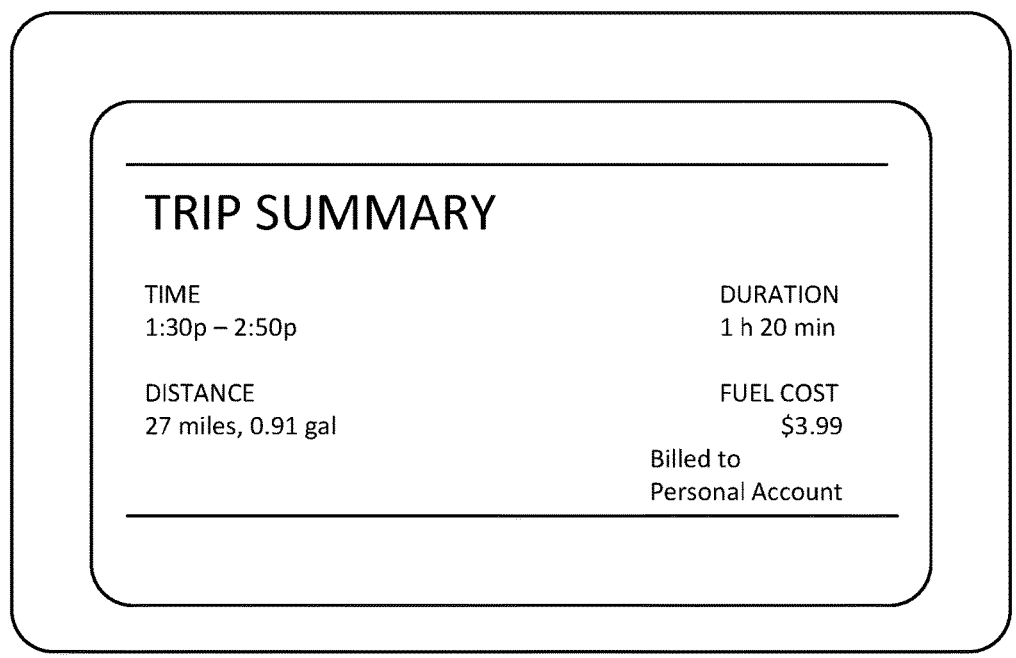
FIG. 16 is a graphic representation of an example trip summary graphical user interface.

Referring now to FIG. 16, depicted is a graphic representation of an example trip summary GUI 1600. The trip summary GUI 1600 may be displayed, for example, on a touchscreen display of the vehicle system 123. The trip summary GUI 1600 may describe the amount of time the vehicle system 123 was used for a given reservation, the distance traveled, the amount of fuel used and the fuel cost attributed to the user 180 associated with the given reservation.

Referring now to FIG. 17, depicted is a graphic representation of an example salutation GUI 1700. The salutation GUI 1700 may be displayed, for example, on a touchscreen display of the vehicle system 123. The salutation GUI 1700 may be personalized for the user 180 based on the user profile data 191 associated with the user 180 of the current reservation.

The implementations of the specification can also relate to an apparatus for performing the operations describe herein. This apparatus may be specially constructed for the required purposes, or it may include a special-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations, or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a stand-alone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:
1. A method for a vehicle, the method comprising:
configuring a vehicle based on one or more settings preferred by a first user;
detecting a presence of a client associated with a second user based on the vehicle pairing with the client via Bluetooth Low Energy (Bluetooth LE);
providing an indication of a location of the vehicle;

responsive to determining that the client associated with the second user is associated with a reservation for the vehicle, receiving second user profile data at the vehicle, wherein the second user profile data is associated with the second user of the vehicle and describes how the one or more settings of the vehicle should be configured for the second user; and reconfiguring, by a processor, the one or more settings of the vehicle based on the second user profile data so that the vehicle is reconfigured for the second user and differently than the one or more settings of the vehicle preferred by the first user.

2. The method of claim 1, further comprising:
determining the one or more settings of the vehicle preferred by the first user from first user profile data describing how the one or more settings of the vehicle should be configured for the first user.

3. The method of claim 2, wherein the first user profile data includes a first description of one or more first ergonomic settings associated with the first user and the second user profile data incudes a second description of one or more second ergonomic settings associated with the second user, and the method further comprises reconfiguring the vehicle from the one or more first ergonomic settings to the one or more second ergonomic settings responsive to receiving the second user profile data at the vehicle.

4. The method of claim 3, wherein reconfiguring the vehicle includes activating and controlling an electric motor of the vehicle to reconfigure an element of the vehicle in accordance with the one or more second ergonomic settings included in the second user profile data.

5. The method of claim 2, wherein:
the vehicle was previously configured to pair with one or more first Bluetooth enabled devices which the first user previously paired with the vehicle and not configured to pair with one or more second Bluetooth enabled devices;
the second user profile data includes device pairings data associated with the second user;
the method further comprises reconfiguring the vehicle based on the second user profile data to automatically pair with the one or more second Bluetooth enabled devices which the second user previously paired with the vehicle; and
following reconfiguration, the vehicle is configured to no longer automatically pair with the one or more first Bluetooth enabled devices.

6. The method of claim 2, wherein:
the vehicle was previously configured to stream one or more first network services to the vehicle using first user account information associated with the first user and not configured to stream one or more second network services to the vehicle using second user account information;
the second user profile data includes the second user account information for the one or more second network services associated with the second user;
the method further comprises reconfiguring the vehicle to be able to stream the one or more second network services to the vehicle using the second user account information; and
following reconfiguration, the vehicle is configured to no longer stream the one or more first network services to the vehicle using the first user account information.

7. The method of claim 2, wherein:
the vehicle was previously configured to include one or more first radio station presents associated with the first user and not configured to include one or more second radio station presets associated with the second user;
the second user profile data includes a description of the one or more second radio station presets associated with the second user;
the method further comprises reconfiguring an infotainment system of the vehicle to include the one or more second radio station presets; and
following reconfiguration, the infotainment system is configured to no longer include the one or more first radio station presets associated with the first user.

8. The method of claim 2, wherein:
the vehicle was previously configured to include one or more first settings for a navigation system associated with the first user and not configured to include one or more second settings associated with the second user;
the second user profile data includes one or more second settings for the navigation system of the vehicle;
the method further comprises reconfiguring the navigation system of the vehicle based on the one or more second settings for the navigation system; and
following reconfiguration, the navigation system is configured to no longer include the one or more first settings associated with the first user.

9. The method of claim 2, wherein:
the vehicle was previously configured to include first electronic calendar data for one or more first electronic calendars associated with the first user and not configured to include second electronic calendar data for one or more second electronic calendars associated with the second user;
the second user profile data includes second electronic calendar data for one or more second electronic calendars associated with the second user;
the method further comprises reconfiguring the vehicle so that the second user can access the one or more second electronic calendars from a display of the vehicle; and
following reconfiguration, the vehicle is configured to no longer include the first electronic calendar data associated with the first user.

10. The method of claim 1, wherein the second user profile data is received at the vehicle from the client via Bluetooth LE.

11. The method of claim 1, wherein the indication of the location of the vehicle includes flashing the vehicle's lights.

12. The method of claim 1, wherein the indication of the location of the vehicle includes displaying a personalized message for the second user on an outward facing panel of a heads-up display unit of the vehicle.

13. A non-transitory computer-readable medium having computer instructions stored thereon that are executable by a processing device to perform or control performance of operations, the operations comprising:
determining one or more settings of a vehicle preferred by a first user from first user profile data describing how the one or more settings of the vehicle should be configured for the first user;
configuring the vehicle based on the one or more settings preferred by the first user, wherein the vehicle is configured to stream one or more first network services to the vehicle using first user account information associated with the first user and not configured to stream one or more second network services to the vehicle using second user account information;
receiving second user profile data at the vehicle, wherein the second user profile data is associated with a second user of the vehicle and describes how one or more settings of the vehicle should be configured for the second user including the second user account information for the one or more second network services associated with the second user;

reconfiguring, by a processor, the one or more settings of the vehicle based on the second user profile data so that the vehicle is reconfigured for the second user and differently than the one or more settings of the vehicle preferred by the first user; and reconfiguring the vehicle to be able to stream the one or more second network services to the vehicle using the second user account information, wherein following reconfiguration, the vehicle is configured to no longer stream the one or more first network services to the vehicle using the first user account information.

14. The non-transitory medium of claim 13, wherein the operations further comprise:

determining the one or more settings of the vehicle preferred by the first user from first user profile data describing how the one or more settings of the vehicle should be configured for the first user.

15. The non-transitory medium of claim 14, wherein the first user profile data includes a first description of one or more first ergonomic settings associated with the first user and the second user profile data incudes a second description of one or more second ergonomic settings associated with the second user, and the operations further comprise reconfiguring the vehicle from the one or more first ergonomic settings to the one or more second ergonomic settings responsive to receiving the second user profile data at the vehicle.

16. The non-transitory medium of claim 15, wherein reconfiguring the vehicle includes activating and controlling an electric motor of the vehicle to reconfigure an element of the vehicle in accordance with the one or more second ergonomic settings included in the second user profile data.

17. The non-transitory medium of claim 14, wherein:

the vehicle was previously configured to pair with one or more first Bluetooth enabled devices which the first user previously paired with the vehicle and not configured to pair with second Bluetooth enabled devices;

the second user profile data includes device pairings data associated with the second user;

the operations further comprise reconfiguring the vehicle based on the second user profile data to automatically pair with the one or more first Bluetooth enabled devices which the second user previously paired with the vehicle; and following reconfiguration, the vehicle is configured to no longer automatically pair with the one or more first Bluetooth enabled devices.

18. The non-transitory medium of claim 14, wherein the operations further comprise:

detecting a presence of a client associated with a second user based on the vehicle pairing with the client via Bluetooth Low Energy (Bluetooth LE);

providing an indication of a location of the vehicle.

19. The non-transitory medium of claim 14, wherein:

the vehicle was previously configured to include one or more first settings for a navigation system associated with the first user and not configured to include one or more second settings associated with the second user;

the second user profile data includes one or more second settings for the navigation system of the vehicle;

the operations further comprise reconfiguring the navigation system of the vehicle based on the one or more second settings for the navigation system; and following reconfiguration, the navigation system is configured to no longer include the one or more first settings associated with the first user.

20. The non-transitory medium of claim 14, wherein:

the vehicle was previously configured to include first electronic calendar data for one or more first electronic calendars associated with the first user and not configured to include second electronic calendar data for one or more second electronic calendars associated with the second user;

the second user profile data includes first electronic calendar data for one or more second electronic calendars associated with the second user;

the operations further comprise reconfiguring the vehicle so that the second user can access the one or more second electronic calendars from a display of the vehicle; and following reconfiguration, the vehicle is configured to no longer include the first electronic calendar data associated with the first user.

* * * * *